US012734485B2

(12) United States Patent
Takada et al.

(10) Patent No.: US 12,734,485 B2
(45) Date of Patent: Sep. 15, 2026

(54) METHOD AND SYSTEM FOR REDUCING VOLUME OF RAW MATERIAL LIQUID

(71) Applicant: Asahi Kasei Kabushiki Kaisha, Tokyo (JP)

(72) Inventors: Ryoichi Takada, Tokyo (JP); Yuki Suga, Tokyo (JP); Takahiro Osaki, Tokyo (JP); Keitaro Suzumura, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 530 days.

(21) Appl. No.: 18/281,533

(22) PCT Filed: Mar. 15, 2022

(86) PCT No.: PCT/JP2022/011704
§ 371 (c)(1),
(2) Date: Sep. 11, 2023

(87) PCT Pub. No.: WO2022/196698
PCT Pub. Date: Sep. 22, 2022

(65) Prior Publication Data

US 2024/0149220 A1 May 9, 2024

(30) Foreign Application Priority Data

Mar. 15, 2021 (JP) ................................ 2021-041457

(51) Int. Cl.
*B01D 61/58* (2006.01)
*B01D 61/00* (2006.01)
(Continued)

(52) U.S. Cl.
CPC ......... *B01D 61/58* (2013.01); *B01D 61/0024* (2022.08); *B01D 61/32* (2013.01);
(Continued)

(58) Field of Classification Search
CPC ........... B01D 2311/04; B01D 2311/06; B01D 2311/25; B01D 2317/02; B01D 2317/04;
(Continued)

(56) References Cited

U.S. PATENT DOCUMENTS

2005/0202154 A1 9/2005 Diosady et al.
2018/0093030 A1 4/2018 Testekin et al.
(Continued)

FOREIGN PATENT DOCUMENTS

CN 205874272 U 1/2017
EP 4032601 A1 7/2022
(Continued)

OTHER PUBLICATIONS

Supplementary European Search Report issued in European Patent Application No. 22771443.3 dated May 9, 2025.
(Continued)

*Primary Examiner* — Jennifer Wecker
(74) *Attorney, Agent, or Firm* — Morgan, Lewis & Bockius LLP

(57) ABSTRACT

A method for reducing the volume of a raw material liquid, the raw material liquid containing at least a valuable and a first solvent, wherein the raw material liquid further contains an accessory component other than the valuable and the first solvent, or contains a mixed solvent including the first solvent and a second solvent as a solvent, and the method for reducing the volume of the raw material liquid is performed by combining a first process in which the first solvent is removed from the raw material liquid and a second process in which the concentration of the second solvent or the accessory component is adjusted from the raw material liquid using a dialysis method with a dialysis membrane.

20 Claims, 9 Drawing Sheets

(51) Int. Cl.

| | |
|---|---|
| ***B01D 61/32*** | (2006.01) |
| ***B01D 71/02*** | (2006.01) |
| *B01D 61/24* | (2006.01) |

(52) U.S. Cl.

CPC .......... *B01D 71/028* (2013.01); *B01D 61/002* (2013.01); *B01D 61/243* (2013.01); *B01D 2317/02* (2013.01); *B01D 2317/04* (2013.01)

(58) Field of Classification Search

CPC ............. B01D 61/002; B01D 61/0024; B01D 61/025; B01D 61/027; B01D 61/243; B01D 61/32; B01D 61/58; B01D 71/028

See application file for complete search history.

(56) References Cited

U.S. PATENT DOCUMENTS

| | | | |
|---|---|---|---|
| 2018/0135006 | A1 | 5/2018 | Maiser et al. |
| 2021/0339194 | A1 | 11/2021 | Hotta et al. |
| 2022/0187015 | A1 | 6/2022 | Mikawa et al. |
| 2022/0226777 | A1 | 7/2022 | Fujita et al. |

FOREIGN PATENT DOCUMENTS

| | | | | | |
|---|---|---|---|---|---|
| JP | S52-143961 | A | | 11/1977 | |
| JP | S52-143962 | A | | 11/1977 | |
| JP | S63-221805 | A | | 9/1988 | |
| JP | H05-503018 | A | | 5/1993 | |
| JP | H09-220455 | A | | 8/1997 | |
| JP | H11-347384 | A | | 12/1999 | |
| JP | 2000-210537 | A | | 8/2000 | |
| JP | 2005-225770 | A | | 8/2005 | |
| JP | 2006-212512 | A | | 8/2006 | |
| JP | 2011-173035 | A | | 9/2011 | |
| JP | 2013-010704 | A | | 1/2013 | |
| JP | 2020-174548 | A | | 10/2020 | |
| JP | 2020-196007 | A | | 12/2020 | |
| JP | 2020-196009 | A | | 12/2020 | |
| WO | 2018/043450 | A1 | | 3/2018 | |
| WO | 2020/050282 | A1 | | 3/2020 | |
| WO | 2020/241795 | A1 | | 12/2020 | |
| WO | 2020/241865 | A1 | | 12/2020 | |
| WO | 2021/054406 | A1 | | 3/2021 | |
| WO | WO-2021224205 | A1 | * | 11/2021 | .......... B01F 25/4333 |
| ZA | 200308850 | B | | 11/2004 | |

OTHER PUBLICATIONS

Partial Supplementary European Search Report issued in European Patent Application No. 22771443.3 dated Feb. 17, 2025.

Virgen-Ortiz et al., "Method to concentrate protein solutions based on dialysis-freezing-centrifugation: Enzyme applications," Analytical Biochemistry, 426 (1): 4-12 (2012).

Aygun Saniye Seylan, "Recovery of sericin protein from silk processing wastewaters by membrane technology," Thesis, Graduate School of Natural and Applied Sciences of Middle East Technical University, pp. 1 to 202 (Jul. 1, 2008).

Yehl et al., "Hollow Fiber Countercurrent Dialysis for Continuous Buffer Exchange of High-Value Biotherapeutics," Biotechnology Progress, 35 (2): e2763 (2018).

International Search Report issued in corresponding International Patent Application No. PCT/JP2022/011704 dated May 17, 2022.

International Preliminary Report on Patentability and Written Opinion issued in corresponding International Patent Application No. PCT/JP2022/011704 dated Sep. 28, 2023.

* cited by examiner

METHOD AND SYSTEM FOR REDUCING VOLUME OF RAW MATERIAL LIQUID

FIELD

The present invention relates to a method and system for reducing the volume of a raw material liquid.

BACKGROUND

Volume reduction of raw material liquids containing valuable substances is often carried out in industry.

For example, raw material liquids used in purification processes for peptides, DNA, RNA and enzymes, as well as their derivative compounds and starting compounds (hereunder also referred to as "peptides, etc.") often include various organic solvents, organic acids and salts in addition to peptides, etc. and water. By adjusting the solvent composition and the concentration of organic acids and salts in such raw material liquids to within predetermined ranges, it is possible for valuable substances to stably exist in the raw material liquid.

When the solvent composition is altered or the concentration of organic acids and salts varies during the process of volume reduction of a raw material liquid, the peptides, etc. may precipitate, aggregate and denature, resulting in poor volume reduction efficiency. Because peptides, etc. are extremely costly. However, it is desirable to obtain high yield from the process of volume reduction of raw material liquids containing them.

Moreover, when the raw material liquid is to be supplied for a reaction that is unfavorable in the presence of water after volume reduction, it is desirable to absolutely minimize the water content in the volume reduction step.

From the same viewpoint, there is a need for a volume reduction method for raw material liquids wherein the component compositions of the raw material liquids after volume reduction is adjusted to desired values.

Methods of volume reduction of raw material liquids while maintaining their organic solvent concentrations are known, such as a method of membrane concentration while adding a solvent to the raw material liquid (PTL 1).

Dialysis is also known as a method of causing migration of specific components in a raw material liquid through a membrane. (NPL 1)

CITATION LIST

Patent Literature

[PTL 1] Japanese Unexamined Patent Publication No. 2020-196009

Non Patent Literature

[NPL 1] Biotechnol. Prog., 2019, Vol. 35, No. 2, e2763

SUMMARY

Technical Problem

It is an object of the present invention to provide a method for reducing the volume of a raw material liquid that allows the component composition of the raw material liquid to be adjusted to a predetermined value during volume reduction of the raw material liquid, thereby helping to reduce precipitation, aggregation and denaturation of valuable substances, as well as a system for volume reduction of a raw material liquid, to be used in the method.

Solution to Problem

The present invention has been accomplished with the aim of achieving this object.

Examples of specific aspects of the invention are the following.

<Aspect 1> A method for reducing the volume of a raw material liquid in which a raw material liquid including at least a valuable substance and a first solvent is reduced in volume, wherein the raw material liquid:

- further includes an accessory component in addition to the valuable substance and first solvent, or
- includes a mixed solvent of the first solvent and a second solvent as a solvent, and the method for reducing the volume of a raw material liquid is a method combining:
- a first treatment in which the first solvent is removed from the raw material liquid, and
- a second treatment in which the concentration of the second solvent or the accessory component in the raw material liquid is adjusted by dialysis using a dialysis membrane.

<Aspect 2> The method for reducing the volume of a raw material liquid according to aspect 1, wherein the dialysis membrane used in the second treatment is a molecular sieve membrane.

<Aspect 3> The method for reducing the volume of a raw material liquid according to aspect 2, wherein the first treatment is volume reduction treatment using a membrane, by a reverse osmosis method, nanofiltration method or forward osmosis method.

<Aspect 4> The method for reducing the volume of a raw material liquid according to aspect 2, wherein the first treatment is a forward osmosis method.

<Aspect 5> The method for reducing the volume of a raw material liquid according to aspect 3 or 4, wherein:

the permeability of the molecular sieve membrane used in the second treatment for the second solvent or the accessory component is greater than the permeability of the membrane used in the first treatment for the second solvent or the accessory component.

<Aspect 6> The method for reducing the volume of a raw material liquid according to any one of aspects 1 to 5, which includes carrying out the second treatment after having carried out the first treatment.

<Aspect 7> The method for reducing the volume of a raw material liquid according to any one of aspects 1 to 5, which includes carrying out the first treatment after having carried out the second treatment.

<Aspect 8> The method for reducing the volume of a raw material liquid according to any one of aspects 1 to 5, which includes carrying out the first treatment and the second treatment in parallel and mixing the raw material liquid after each treatment.

<Aspect 9> The method for reducing the volume of a raw material liquid according to any one of aspects 6 to 8, wherein the raw material liquid is subjected to the first treatment and the second treatment in a cyclical manner.

<Aspect 10> The method for reducing the volume of a raw material liquid according to aspect 9, wherein the concentration of at least one of the components in the raw material liquid subjected to cyclical volume reduction is measured and the obtained measured value is used for deciding change in execution, halting or the operating conditions of either or both of the first treatment and second treatment.

<Aspect 11> The method for reducing the volume of a raw material liquid according to aspect 10, wherein the concentration measurement is carried out using the measurement results for one or more selected from the group consisting of specific gravity measurement, pH measurement, conductivity measurement, liquid level measurement, optical rotation measurement, refractive index measurement, near-infrared spectroscopic analysis and weight measurement of the raw material liquid subjected to cyclical volume reduction.

<Aspect 12> The method for reducing the volume of a raw material liquid according to any one of aspects 1 to 11, wherein the valuable substance is a pharmaceutical raw material.

<Aspect 13> The method for reducing the volume of a raw material liquid according to any one of aspects 1 to 12, wherein the number-average molecular weight of the valuable substance is 100 to 50,000.

<Aspect 14> The method for reducing the volume of a raw material liquid according to any one of aspects 1 to 13, wherein the valuable substance is one or more selected from the group consisting of amino acids, peptides, proteins, sugars, vaccines, nucleic acids, antibiotics, antibody-drug conjugates (ADC) and vitamins.

<Aspect 15> The method for reducing the volume of a raw material liquid according to any one of aspects 1 to 14, wherein:

- the second solvent is one or more selected from among water, acetonitrile, methanol, ethanol and isopropanol, and
- the accessory component is one or more selected from the group consisting of organic acids, polymers (excluding the valuable substance) and buffer salts.

<Aspect 16> The method for reducing the volume of a raw material liquid according to any one of aspects 1 to 15, wherein the temperature of the raw material liquid is adjusted to within the range of 1° C. or higher and 50° C. or lower.

<Aspect 17> The method for reducing the volume of a raw material liquid according to any one of aspects 3 to 5, wherein one or more selected from among methanol, ethanol, isopropanol and t-butanol is used as the solute in the draw solution for the forward osmosis method.

<Aspect 18> A system for reducing the volume of a raw material liquid in which a raw material liquid including at least a valuable substance and a first solvent is reduced in volume,

- wherein the raw material liquid:
  - further includes an accessory component in addition to the valuable substance and first solvent, or
  - includes a mixed solvent of the first solvent and a second solvent as a solvent, and the system for reducing the volume of a raw material liquid is a system combining:
  - a first unit in which the first solvent is removed from the raw material liquid, and
  - a second unit in which the concentration of the second solvent or the accessory component in the raw material liquid is adjusted by dialysis using a dialysis membrane.

<Aspect 19> The system for reducing the volume of a raw material liquid according to aspect 18, wherein the dialysis membrane used in the second unit is a molecular sieve membrane.

<Aspect 20> The system for reducing the volume of a raw material liquid according to aspect 19, wherein the first unit is a unit that carries out volume reduction treatment using a membrane, by a reverse osmosis method, nanofiltration method or forward osmosis method.

<Aspect 21> The system for reducing the volume of a raw material liquid according to aspect 20, wherein the first unit is a unit that carries out a forward osmosis method.

<Aspect 22> The system for reducing the volume of a raw material liquid according to aspect 20 or 21, wherein:

- the permeability of the molecular sieve membrane in the second unit for the second solvent or the accessory component is greater than the permeability of the membrane in the first unit for the second solvent or the accessory component.

<Aspect 23> The system for reducing the volume of a raw material liquid according to any one of aspects 18 to 22, wherein the first unit and the second unit are connected in series in that order in the direction of flow of the raw material liquid.

<Aspect 24> The system for reducing the volume of a raw material liquid according to any one of aspects 18 to 22, wherein the second unit and the first unit are connected in series in that order in the direction of flow of the raw material liquid.

<Aspect 25> The system for reducing the volume of a raw material liquid according to any one of aspects 18 to 22, which includes a mechanism in which the first unit and the second unit are connected in parallel and the raw material liquid discharged from each unit is mixed.

<Aspect 26> The system for reducing the volume of a raw material liquid according to any one of aspects 23 to 25, which includes a mechanism in which treatment of the raw material liquid by the first unit and the second unit is carried out in a cyclical manner.

<Aspect 27> The system for reducing the volume of a raw material liquid according to aspect 26, which includes:

- a concentration measuring mechanism that carries out concentration measurement of one or more components in the raw material liquid subjected to cyclical volume reduction, and
- a mechanism for deciding change in operation, halting or the operating conditions of one or both units, of the first unit and second unit, based on the measured value obtained by the concentration measuring mechanism.

<Aspect 28> The system for reducing the volume of a raw material liquid according to aspect 27, wherein the concentration measuring mechanism is a mechanism that decides the concentration using the measurement results for one or more selected from the group consisting of specific gravity measurement, pH measurement, conductivity measurement, liquid level measurement, optical rotation measurement, refractive index measurement, near-infrared spectroscopic analysis and weight measurement of the raw material liquid subjected to cyclical volume reduction.

<Aspect 29> The system for reducing the volume of a raw material liquid according to any one of aspects 18 to 28, wherein the valuable substance is a pharmaceutical raw material.

<Aspect 30> The system for reducing the volume of a raw material liquid according to any one of aspects 18 to 29, wherein the number-average molecular weight of the valuable substance is 100 to 50,000.

<Aspect 31> The system for reducing the volume of a raw material liquid according to any one of aspects 18 to 30, wherein the valuable substance is one or more selected from the group consisting of amino acids, peptides, proteins, sugars, vaccines, nucleic acids, antibiotics, antibody-drug conjugates (ADC) and vitamins.

<Aspect 32> The system for reducing the volume of a raw material liquid according to any one of aspects 18 to 31, wherein:

the second solvent is one or more selected from among water, acetonitrile, methanol, ethanol and isopropanol, and the accessory component is one or more selected from the group consisting of organic acids, polymers (excluding the valuable substance) and buffer salts.

<Aspect 33> The system for reducing the volume of a raw material liquid according to any one of aspects 18 to 32, which includes a mechanism that adjusts the temperature of the raw material liquid to within the range of 1° C. or higher and 50° C. or lower.

<Aspect 34> The system for reducing the volume of a raw material liquid according to any one of aspects 20 to 22, wherein an alcohol selected from among methanol, ethanol, isopropanol and t-butanol is used as the solute in the draw solution for the forward osmosis method.

Advantageous Effects of Invention

According to the method for reducing the volume of a raw material liquid of the invention, when reducing the volume of a raw material liquid, it is possible to adjust the component composition of the raw material liquid after volume reduction to a predetermined value. The raw material liquid that has had its volume reduced by the method of the invention therefore has exceedingly minimal precipitation, aggregation and denaturation of valuable substances, an excellent yield of valuable substances, and a composition that is suitable for requirements in subsequent steps.

Using the volume reduction system of the invention allows the method for reducing the volume of a raw material liquid with these advantages to be carried out in an efficient manner.

DESCRIPTION OF EMBODIMENTS

Figure 1:
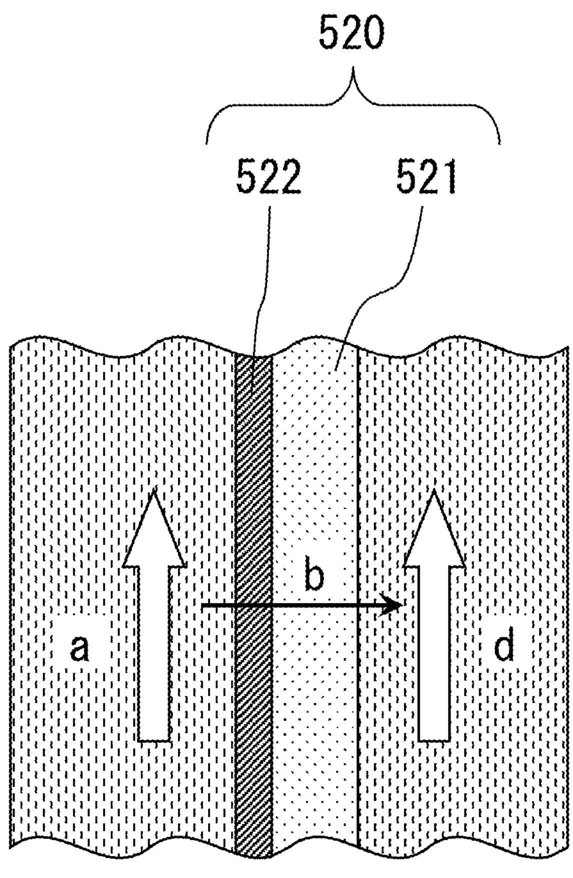
FIG. 1 is a conceptual drawing illustrating the mechanism of action of a forward osmosis method, as an example of first treatment in the method for reducing the volume of a raw material liquid according to the invention.

<System for Reducing Volume of Raw Material Liquid>

The method for reducing the volume of a raw material liquid according to the invention is a method in which a raw material liquid including at least a valuable substance and a first solvent is reduced in volume, wherein the raw material liquid:

further includes an accessory component in addition to the valuable substance and first solvent, or includes a mixed solvent of the first solvent and a second solvent as a solvent, and the method for reducing the volume of a raw material liquid is a method combining:

a first treatment in which the first solvent is removed from the raw material liquid, and a second treatment in which the concentration of the second solvent or the accessory component in the raw material liquid is adjusted by dialysis using a dialysis membrane.

Raw material liquids containing valuable substances often use mixed solvents comprising multiple solvents, or comprise accessory components such as salts or buffer salts, to ensure the solubility and chemical stability of the valuable substances.

The means for concentrating raw material liquids containing such valuable substances include distillation methods, vacuum distillation methods, membrane distillation methods, pervaporation membrane methods, vapor permeable membrane methods, reverse osmosis membrane methods, nanofiltration membrane methods and forward osmosis membrane methods. All such means, however, produce changes in the solvent composition or accessory component concentration as certain components are preferentially removed from the raw material liquid due to differences in chemical and physical properties of the multiple components in the raw material liquid. When this occurs, the valuable substances can potentially precipitate, aggregate or denature during volume reduction of the raw material liquid.

One method for solving this problem may be to successively add the solvent and accessory component to the raw material liquid during volume reduction so as to maintain the solvent composition and accessory component concentration. With this method, however, the concentration of the solvent or accessory component varies drastically near the location where they are added, and therefore this method does not eliminate the risk of precipitation, aggregation and denaturation of valuable substances.

The present inventors focused on dialysis as the means for maintaining or gently adjusting the solvent composition and accessory component concentration. In dialysis, the solvent composition or accessory component concentration in the raw material liquid gradually approaches the solvent composition or accessory component concentration of the dialysate with the passage of time.

If the dialysis is combined with the aforementioned volume reduction means, then it is possible to reduce the volume of the raw material liquid while maintaining the solubility and chemical stability of the valuable substances.

Using the mechanism of action described above, the present invention allows the volume of a raw material liquid to be reduced while absolutely minimizing the risk of precipitation, aggregation and denaturation of valuable substances.

<Explanation of Terms>

<Raw Material Liquid>

The raw material liquid to be reduced in volume by the volume reduction method of the invention is a solution or dispersion containing at least a valuable substance and a first solvent.

The raw material liquid:

further includes an accessory component in addition to the valuable substance and first solvent, or includes a mixed solvent comprising a first solvent and a second solvent, as the solvent.

Examples of raw material liquids to be used in the volume reduction method of the invention include foods; drugs; seawater; and accessory water discharged from gas fields and oil fields. However, considering that the advantage of the invention is allowing volume reduction without the need for heating, the volume reduction method of the invention is effective when applied for raw material liquids containing substances that can potentially undergo decomposition by heating, and especially valuable substances such as pharmaceutical raw materials and functional chemical species.

The temperature of the raw material liquid supplied to the method for reducing the volume of a raw material liquid of the invention is preferably adjusted to the range of 1° C. or higher and 50° C. or lower.

<Valuable Substance>

For the purpose of the present disclosure, a valuable substance is one such as a pharmaceutical raw material or functional chemical species.

Examples of pharmaceutical raw materials include amino acids, peptides, proteins, sugars, vaccines, nucleic acids, antibiotics, antibody-drug conjugates (ADC), yeasts and vitamins.

Amino acids are compounds having one amino acid backbone and comprising a carboxyl group and an amino group, and a portion linking them. For the purpose of the invention, amino acids include essential amino acids, non-essential amino acids and non-natural amino acids.

Examples of essential amino acids include tryptophan, lysine, methionine, phenylalanine, threonine, valine, leucine and isoleucine. Examples of non-essential amino acids include arginine, glycine, alanine, serine, tyrosine, cysteine, asparagine, glutamine, proline, aspartic acid and glutamic acid.

A non-natural amino acid is any compound that is artificial and not found in nature, and that has one amino acid backbone in the molecule. For the present purpose, non-natural amino acids for pharmaceutical raw materials include labeled amino acids and functionalized amino acids.

A labeled amino acid is a compound having a labeling compound bonded to an amino acid backbone. Examples of labeling compounds include pigments, fluorescent substances, luminescent substances, enzyme substrates, coenzymes, antigenic substances and protein binding substances.

Functionalized amino acids include photoresponsive amino acids, photo-switchable amino acids, fluorogenic probe amino acids and fluorescent-labeled amino acids.

Peptides are compounds having amino acid residues of at least 2 and less than 70 residues bonded together, either in a linear or cyclic fashion. Examples of peptides for the present purpose include L-alanyl-L-glutamine, β-alanyl-L-histidinecyclosporin and glutathione.

Proteins are generally amino acid residue-bonded compounds having longer chain lengths than peptides. Examples of proteins for the present purpose include interferon-α, interferon-β, interleukin-1 to 12, growth hormones, erythropoietin, insulin, granulocyte colony-stimulating factor (G-CSF), tissue plasminogen activator (TPA), sodium diuretic peptide, blood clotting factor VIII, somatomedin, glucagon, growth hormone releasing factor, serum albumin, calcitonin and LIPASE G AMANO 50.

Examples of sugars include monosaccharides, disaccharides, sugar chains (excluding disaccharides) and sugar chain derivatives.

Examples of monosaccharides include glucose, fructose, galactose, mannose, ribose and deoxyribose. Examples of disaccharides include maltose, sucrose and lactose.

Sugar chains, for the present purpose, exclude disaccharides and include cellulose, glycosaminoglycan, starch, sacran, dextran, dextrin, inulin, curdlan, fucoidan, fructan, pullulan, pectin, polydextrose, maltodextrin, lignin, xylan, mannan, glucomannan, glucuronoxylan and xylose. Examples of sugar chain derivatives include N-acetylglucosamine, N-acetylgalactosamine, N-acetylneuraminic acid.

Examples of vaccines include hepatitis A vaccine, hepatitis B vaccine and hepatitis C vaccine;

examples of nucleic acids include oligonucleotides, RNA, aptamers and decoys;

examples of antibiotics include streptomycin and vancomycin; and examples of antibody-drug conjugates (ADC) include brentuximab vedotin (Adcetris), trastuzumab emtansine (Kadcyla) and gemtuzumab ozogamicin (Mylotarg).

Examples of yeasts include *Saccharomyces cerevisiae, Pichia stipitis, Candida shehatae* and *Pachysolen tannophilus*, as well as their variants.

Examples of vitamins include vitamin A, vitamin B and vitamin C, as well as their derivatives and salts. Vitamin B includes vitamin B6 and vitamin B12, for example.

Functional chemical species are chemical species that can be used as functional chemicals, or their modified forms, precursors or starting materials.

Examples of functional chemical species include metal nanoparticles, semiconductor nanoparticles, metal colloids, nano diamonds, porous nano clay, metal organic frameworks (MOFs), carbon nanotubes, fullerene, graphene, graphene oxide, carbon nanohorns and cellulose nanofibers, as well as their modified forms, precursors and starting materials.

The molecular weight of a valuable substance in the raw material liquid supplied to the method for reducing the volume of a raw material liquid of the invention is preferably in the range of 100 to 500,000, more preferably in the range of 100 to 50,000 and even more preferably in the range of 100 to 30,000, as the number-average molecular weight based on polyethylene oxide, in measurement by gel permeation chromatography.

<Solvent>

For the purpose of the disclosure, a solvent is a compound that can dissolve or disperse the valuable substance, and accessory components if present.

The solvent will typically be one or more selected from among water and organic solvents.

An organic solvent is an organic compound having one or more carbon atoms, one mode being a compound that is liquid at 0° C. or higher and below 50° C., at ordinary pressure.

However, carboxylic acids are excluded from solvents according to the invention.

Examples of organic solvents include alcohols, esters, ethers, aprotic polar compounds, aromatic compounds, aliphatic compounds, chlorinated hydrocarbons and ketones.

Specific examples of organic solvents include:

alcohols such as methanol, ethanol, 1-propyl alcohol, isopropanol, normal-butanol, sec-butanol, t-butanol and hexafluoroisopropyl alcohol;

esters such as methyl formate, ethyl formate, methyl acetate, ethyl acetate, isopropyl acetate, butyl acetate and isobutyl acetate;

ethers such as tetrahydrofuran, 2-methyltetrahydrofuran, 1,4-dioxane, cyclopentylmethyl ether, t-butylmethyl ether, anisole and 1,2-dimethoxyethane;

aprotic polar compounds such as acetonitrile, dimethyl acetamide, N-methylpyrrolidone, N,N-dimethylformamide, dimethyl sulfoxide, nitromethane and sulfolane;

aromatic compounds such as benzene, toluene, xylene, cumene and pyridine;

aliphatic compounds such as heptane, hexane, cyclohexane, methylcyclohexane and tetralin;

chlorinated hydrocarbons such as dichloromethane, chloroform, carbon tetrachloride, 1,2-dichloroethane, 1,2-dichloroethene, 1,1,1-trichloroethane, 1,1,2-trichloroethene and chlorobenzene;

ketones such as acetone, methyl butyl ketone, methyl ethyl ketone and methyl isobutyl ketone; and aldehydes such as formaldehyde, acetaldehyde, propionaldehyde, butanal, acrolein, benzaldehyde, furfural and vanillin.

When the solvent of the raw material liquid includes only a single type of solvent, the single solvent is the first solvent.

When the solvent of the raw material liquid includes multiple solvents, one of the multiple solvents is the first solvent, and one or more of the solvents other than the first solvent are second solvents.

As used herein, "first solvent and second solvent" are not fixed concepts and may vary depending on the type of valuable substance in the raw material liquid. That is, solvent A which was the first solvent in a raw material liquid containing one valuable substance A may become the second solvent in a different raw material liquid containing another valuable substance B.

The following are non-limitative typical examples for the raw material liquid to which the method for reducing the volume of a raw material liquid of the invention may be applied.

A liquid in which the first solvent is water and the second solvent is one or more selected from among acetonitrile, methanol, ethanol and isopropanol;

a liquid in which the first solvent is one or more selected from among methanol, ethanol, isopropanol and acetonitrile and the second solvent is water;

a liquid in which the first solvent is one or more selected from among methanol, ethanol and tetrahydrofuran and the second solvent is hexane; and a liquid in which the first solvent is water and the second solvent is one or more selected from among dimethyl acetamide, N-methylpyrrolidone, N,N-dimethylformamide and dimethyl sulfoxide.

The amount of first solvent in the raw material liquid may be set as desired, according to the solubility and chemical stability of the valuable substance(s) before and after volume reduction, and convenience for the reaction predicted after volume reduction.

When the solvent of the raw material liquid includes both the first solvent and second solvent, the mixing proportion of the first solvent and second solvent may likewise be set as desired, according to the solubility and chemical stability of the valuable substance(s) before and after volume reduction, and convenience for the reaction predicted after volume reduction.

<Accessory Component>

As used herein "accessory component" refers to a component that is optionally included in the raw material liquid, being a component in the raw material liquid other than the valuable substance and solvent. When the solvent of the raw material liquid includes both the first solvent and second solvent, an accessory component is a component in the raw material liquid other than the valuable substance, first solvent and second solvent.

The accessory component may be an organic acid, a polymer (excluding the valuable substance) or a buffer salt, for example.

Compounds of organic acids as accessory components for the invention include formic acid, acetic acid, propionic acid, citric acid, fluoroacetic acid, difluoroacetic acid, trifluoroacetic acid, oxalic acid, gluconic acid, lactic acid, glycolic acid and glyceric acid.

Polymers to be used as accessory components exclude those qualifying as valuable substances. Examples of polymers as accessory components for the invention include polyethylene oxide, polypropylene oxide, and copolymers of ethylene oxide and propylene oxide.

Examples of salts or buffer salts include sodium chloride, magnesium chloride, calcium chloride, sodium hydrogen carbonate, potassium hydrogen carbonate, sodium sulfate, sodium hydrogen sulfate, potassium hydrogen sulfate, magnesium sulfate, potassium sulfate, sodium phosphate, disodium hydrogen phosphate, sodium dihydrogen phosphate, potassium phosphate, dipotassium hydrogen phosphate, potassium dihydrogen phosphate, sodium carbonate, potassium carbonate, sodium hydroxide and potassium hydroxide, organic acid salts such as sodium acetate, magnesium acetate, sodium citrate and magnesium citrate, and ammonium chloride, ammonium sulfate, ammonium carbonate or ammonia.

The raw material liquid will often contain multiple accessory components.

When the raw material liquid includes an accessory component, the amount of accessory component in the raw material liquid may be set as desired, according to the solubility and chemical stability of the valuable substance (s), and convenience for the reaction predicted after volume reduction.

(Copresence of Second Solvent and Accessory Component)

The raw material liquid of the disclosure may comprise the valuable substance, first solvent, second solvent and accessory component. In this case, the method for reducing the volume of a raw material liquid of the invention can yield a volume-reduced liquid having the concentrations of the second solvent and accessory component adjusted to the desired values.

A preferred example of a raw material liquid comprising a valuable substance, first solvent, second solvent and accessory component to be applied in the method for reducing the volume of a raw material liquid of the invention is one in which:

the first solvent is water, the second solvent is one or more selected from among acetonitrile, methanol, ethanol and isopropanol, and the accessory component is one or more selected from among acetic acid and trifluoroacetic acid.

Most preferably, the first solvent is water, the second solvent is acetonitrile, and the accessory component is acetic acid, which will typically be in a weight ratio of 50 (water): 49 (acetonitrile):1 (acetic acid).

<Permeability>

For the purpose of the disclosure, "permeability" is the ease of permeation of the second solvent or accessory component through a membrane.

The permeability according to the disclosure can be measured in the following manner.

A test solution is prepared with the second solvent or accessory component dissolved in the first solvent to a predetermined concentration. A reference solution consisting of the first solvent is also prepared. The test solution and reference solution are contacted across a membrane for a predetermined time, during which the amount of second solvent or accessory component passing through the membrane and migrating from the test solution to the reference solution is quantified. The amount of permeated component is evaluated as the "permeability", based on the allocated values for the test solution concentration, membrane area and contact time.

The predetermined concentration of the second solvent or accessory component in the test solution and the contact time will typically be 1 mol/L and 20 minutes, respectively. However, for components that might breakdown the membrane at a concentration of 1 mol/L (such as trifluoroacetic acid, for example), the concentration and contact time for the second solvent or accessory component in the test solution may be 0.01 mol/L and 180 minutes, respectively.

Specifically, the measurement may be carried out by the method described below under "Examples".

<Yield of Valuable Substance>

As used herein, "yield of the valuable substance" is the value of the total amount of the valuable substance obtained by the method for reducing the volume of a raw material liquid, divided by the total amount of the valuable substance loaded for the process of volume reduction of the raw material liquid, expressed as a percentage.

When the valuable substance has precipitated or aggregated while carrying out the method for reducing the volume of a raw material liquid, that portion is not considered to be the valuable substance, even if the chemical structure is unchanged. Needless to mention, if the chemical structure of the valuable substance has changed while carrying out the method for reducing the volume of a raw material liquid, that portion is also not considered to be the valuable substance.

In the method for reducing the volume of a raw material liquid of the disclosure, it is possible for the yield of the valuable substance to be 70% or greater, 80% or greater, 90% or greater or 95% or greater, or even 99% or greater.

<Volume Reduction Factor>

The "volume reduction factor", for the purpose of the disclosure, is the value of the mass of the raw material liquid before volume reduction divided by the mass of the raw material liquid after volume reduction. With the method for reducing the volume of a raw material liquid of the invention, it is possible to reduce the volume of the raw material liquid to a high volume reduction factor without impairing the stability of the valuable substance.

With the method for reducing the volume of a raw material liquid of the invention it is possible to reduce the volume of the raw material liquid to a volume reduction factor of at least 3, at least 4 or at least 5, without impairing the stability of the valuable substance. The upper limit for the volume reduction factor will depend on the concentration and solubility of the valuable substance in the raw material liquid, but it will generally be a factor of about 50.

<Molecular Sieve Membrane>

The molecular sieve membrane of the disclosure is a membrane having a smaller molecular cutoff than the pore diameter of an ultrafiltration membrane. A molecular sieve membrane according to the disclosure is defined by having a molecular cutoff of 5,000 or lower, 4,000 or lower or 3,000 or lower. The molecular cutoff of the molecular sieve membrane of the invention may be 2,000 or lower, 1,500 or lower, 1,000 or lower or 750 or lower, for example. The lower limit for the molecular cutoff of the molecular sieve membrane is about 100.

The first treatment of the volume reduction method for a raw material liquid of the disclosure may therefore employ a molecular sieve membrane as the forward osmosis membrane and nanofiltration membrane.

As mentioned above, the method for reducing the volume of a raw material liquid according to the invention is a method in which a raw material liquid including at least a valuable substance and a first solvent is reduced in volume, wherein the raw material liquid:

further includes an accessory component in addition to the valuable substance and first solvent, or includes a mixed solvent of the first solvent and a second solvent as a solvent, and the method for reducing the volume of a raw material liquid is a method combining:

a first treatment in which the first solvent is removed from the raw material liquid, and a second treatment in which the concentration of the second solvent or the accessory component in the raw material liquid is adjusted by dialysis using a dialysis membrane.

A preferred embodiment of the invention will now be explained in detail as a non-limitative example.

<First Treatment>

The first treatment in the method for reducing the volume of a raw material liquid of the invention is treatment to remove primarily the first solvent from the raw material liquid.

Examples for the first treatment include an evaporative method, thin-film distillation method, evaporation method, membrane distillation method, pervaporation membrane method, vapor permeable membrane method, reverse osmosis membrane method, nanofiltration membrane method and forward osmosis membrane method. An evaporation method is a method of circulating a gas through a container containing the raw material liquid, gasifying the first solvent in the raw material liquid and removing it out of the container.

Among such treatments, evaporation methods, reverse osmosis membrane methods, nanofiltration membrane methods and forward osmosis membrane methods allow the first solvent to be removed from the raw material liquid without heating, and are therefore effective for reducing denaturation of valuable substances by heating.

From the viewpoint of volume reduction efficiency, the first treatment is preferably volume reduction treatment using a membrane, such as by a reverse osmosis method, nanofiltration method or forward osmosis method.

(Forward Osmosis Method)

Of the treatments mentioned above, a forward osmosis membrane method is most effective for causing the first solvent to migrate with high driving force without requiring mechanical driving force, by using an appropriate draw solution.

A forward osmosis method will now be explained as an example of the first treatment in the method for reducing the volume of a raw material liquid of the invention.

FIG. 1 is a schematic view showing the mechanism of action of solvent migration using a forward osmosis membrane.

In FIG. 1, a raw material liquid (a) flows on one side of a forward osmosis membrane (520) while a draw solution (d) with a higher osmotic pressure than the raw material liquid (a) flows on the opposite side, the two liquids contacting through the forward osmosis membrane (520). With the difference in osmotic pressure between the raw material liquid (a) and draw solution (d) as the driving force, primarily the first solvent (b) that is in the raw material liquid (a) passes through the forward osmosis membrane (520) and migrates into the draw solution (d).

The forward osmosis membrane (520) in FIG. 1 has a substrate layer (521) and an active layer (522) formed on one side of the substrate layer (521). The active layer (522) has an exceedingly dense structure that allows passage of small molecules while preventing passage of the valuable substance, and is formed on the side of the substrate layer (521) that is in contact with the raw material liquid (a).

The material used for the substrate layer (521) will generally be a porous membrane. The draw solution (d) permeates through the substrate layer (521) section of the forward osmosis membrane (520) composed of the porous membrane, with the raw material liquid (a) and draw solution (d) contacting through the active layer (522). In this case the first solvent in the raw material liquid (a) migrates to the draw solution (d) side which has higher osmotic pressure, resulting in volume reduction.

The forward osmosis membrane may have any structural shape, such as a hollow fiber membrane shape, a tubular shape or a flat membrane shape. A hollow fiber forward osmosis membrane is preferred as it allows formation of a flow channel for passage of the raw material liquid and draw solution, without using a spacer, and allows uniform volume reduction.

The material of the porous membrane forming the substrate layer may be selected from among widely used materials. However, a material that dissolves or swells in an organic solvent of the solvent in the raw material liquid and is unable to maintain the shapes of the membrane pores, cannot be used.

Specific examples for the material of the porous membrane composing the substrate layer include polysulfone, polyethersulfone, polyvinylidene fluoride, polyacrylonitrile, polyethylene, polypropylene, cellulosic polymers, polyketones, polyamides, polyimides, polyetherether ketone and polybenzimidazole, as well as their crosslinked products, and it preferably has at least one of these as the main component. From the viewpoint of solvent resistance, the material of the porous membrane composing a hollow fiber forward osmosis membrane preferably has one or more selected from among polysulfone, polyethersulfone, polyketones, polyamides and polyimides and their crosslinked products, as the main component.

The material used as the active layer will mainly be polyamide. An active layer composed of polyamide can be formed by interfacial polymerization of a polyfunctional acid halide and a polyfunctional amine on the substrate layer.

A polyfunctional acid halide is an acid halide compound having two or more acid halide groups in the molecule. Specific examples include:

halides of fatty acids such as oxalic acid, malonic acid, maleic acid, fumaric acid, glutaric acid, 1,3,5-cyclohexanetricarboxylic acid, 1,3-cyclohexanedicarboxylic acid and 1,4-cyclohexanedicarboxylic acid; and acid halide compounds of aromatic acids such as phthalic acid, isophthalic acid, 1,3,5-benzenetricarboxylic acid, 1,2,4-benzenetricarboxylic acid, 1,3-benzenedicarboxylic acid and 1,4-benzenedicarboxylic acid. Any of these acid halide compounds may be used alone or in combinations of two or more.

According to the invention, from the viewpoint of economy, availability, handleability and ease of reaction it is most preferred to use trimesoyl chloride alone, a mixture of trimesoyl chloride and isophthaloyl chloride, or a mixture of trimesoyl chloride and terephthaloyl chloride.

A polyfunctional amine is an amino compound having two or more amino groups in the molecule, and there may be mentioned aromatic amino compounds and aliphatic amino compounds.

Specific examples of aromatic amino compounds include m-phenylenediamine, p-phenylenediamine, 3,3'-diaminodiphenylmethane, 4,4'-diaminodiphenylamine, 4,4'-diaminodiphenyl ether, 3,4'-diaminodiphenyl ether, 3,3'-diaminodiphenylamine, 3,5-diaminobenzoic acid, 4,4'-diaminodiphenylsulfone, 3,3'-diaminodiphenylsulfone, 3,4'-diaminodiphenylsulfone, 1,3,5-triaminobenzene and 1,5-diaminonaphthalene. These may be used alone or as mixtures.

From the viewpoint of economy, availability, handleability and ease of reaction, the aromatic amino compound of the invention is most preferably one or more selected from among m-phenylenediamine and p-phenylenediamine.

Specific examples of aliphatic amino compounds include piperazine, 2,5-dimethylpiperazine, 2-methylpiperazine, 2,6-dimethylpiperazine, 2,3,5-trimethylpiperazine, 2-ethylpiperazine, 2,5-diethylpiperazine, 2,3,5-triethylpiperazine, 2-n-propylpiperazine, 2,5-di-n-butylpiperazine, ethylenediamine and bispiperidylpropane. These may be used alone or as mixtures.

The interfacial polymerization between the polyfunctional acid halide and the polyfunctional amine can be carried out by an established method.

The final active layer may be obtained via appropriate heat treatment. The heat treatment may be carried out using hot water, or using high-temperature, high-pressure water vapor in a pressure vessel such as an autoclave.

Heat treatment of the active layer can reduce back diffusion of the draw solution, although the reason for this is not fully understood.

When a hollow fiber forward osmosis membrane is used, the outer diameter of the hollow fiber membrane may be 300 μm or greater and 5,000 μm or less, for example, and preferably 350 μm or greater and 4,000 μm or less, while the inner diameter of the hollow fiber membrane may be 200 μm or greater and 4,000 μm or less, for example, and preferably 250 μm or greater and 1,500 μm or less. If the inner diameter of the hollow fiber is less than 200 μm, then high back pressure may be generated when the liquid circulates through the spaces inside the hollow fibers. If the inner diameter of the hollow fibers exceeds 4,000 μm, then when a plurality of forward osmosis membranes are modularized, the membrane area in the module will be too small and volume reduction may not be effectively accomplished.

The solute used in the draw solution used for the forward osmosis method may be a solution containing an organic solvent, an organic acid and a buffer salt.

The organic solvent used may be any of the organic solvents mentioned above as solvents for the raw material liquid. Specific examples include one or more selected from among methanol, ethanol and isopropanol and t-butanol.

Examples of organic acids include formic acid, acetic acid, propionic acid, citric acid, fluoroacetic acid, difluoroacetic acid, trifluoroacetic acid, oxalic acid, gluconic acid, lactic acid, glycolic acid and glycerinic acid.

Examples of buffer salts include metal salts of the aforementioned organic acids, inorganic salts such as sodium chloride, magnesium chloride, calcium chloride, sodium sulfate, sodium hydrogen carbonate, potassium hydrogen carbonate, sodium hydrogen sulfate, potassium hydrogen sulfate, magnesium sulfate, potassium sulfate, sodium phosphate, disodium hydrogen phosphate, sodium dihydrogen phosphate, potassium phosphate, dipotassium hydrogen phosphate, potassium dihydrogen phosphate, sodium carbonate, potassium carbonate, sodium hydroxide, potassium hydroxide, and organic acid salts such as sodium acetate, magnesium acetate, sodium citrate and magnesium citrate.

The concentration of the solute in the draw solution may be appropriately set according to the composition of the raw material liquid and the type of solute in the draw solution, so as to ensure migration of the first solvent from the raw material liquid to the draw solution, and to create an osmotic pressure difference that can generate driving force in a range such that the composition of the raw material liquid near the forward osmosis membrane does not change drastically.

In the forward osmosis method, the driving force by which the first solvent (b) migrates from the raw material liquid (a) to the draw solution (d) is the osmotic pressure difference between the raw material liquid (a) and the draw solution (b). It is therefore necessary to refresh the liquid at the interface between the active layer (522) and the raw material liquid (a) or draw solution in the forward osmosis membrane (520). The raw material liquid (a) and draw solution (d) must therefore flow at a suitable flow rate on both sides of the forward osmosis membrane (520).

In FIG. 1, the raw material liquid (a) and draw solution (d) are shown flowing in a parallel flow, but their flow may be a countercurrent flow instead.

Figure 2:
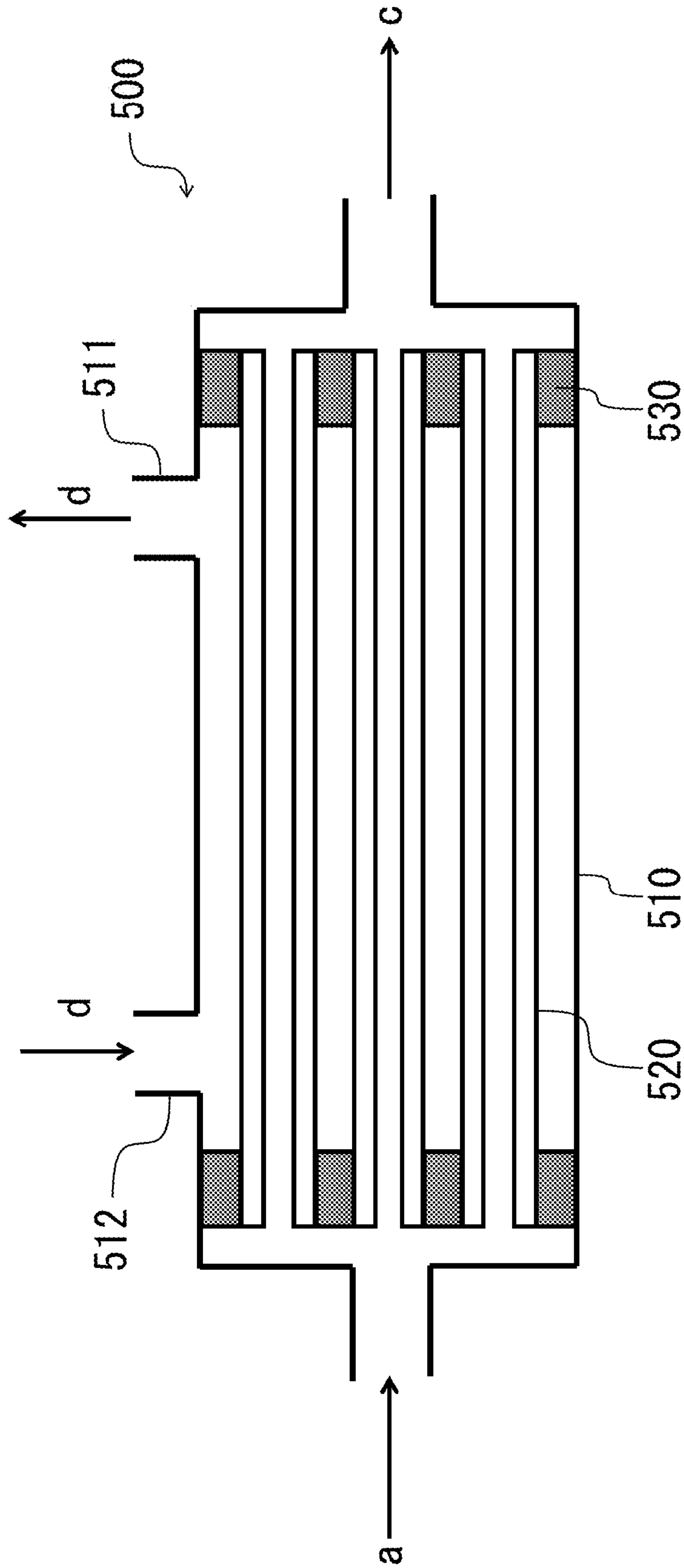
FIG. 2 is a simplified cross-sectional view illustrating an example of the structure of a forward osmosis membrane module used in the system for reducing the volume of a raw material liquid according to the invention.

FIG. 2 is a schematic view showing an example of the structure of a forward osmosis membrane module that is preferably used as the first unit for carrying out the first treatment in the method for reducing the volume of a raw material liquid of the invention.

In the forward osmosis membrane module (500) shown in FIG. 2, a plurality of hollow fiber forward osmosis membranes (520) are housed in a housing (510). Both ends of the forward osmosis membrane (520) are adhesively anchored to the housing (510) by an adhesive resin (530). Two housing side tubes are provided on the side wall of the housing (510). One of the housing side tubes is a draw solution inlet (511) while the other is a draw solution outlet (512).

The interior of the housing (510) is divided into two parts, a space through which the raw material liquid (a) flows and the space through which the draw solution (d) flows, by the outer walls of the forward osmosis membranes (520) and the adhesive resin (530), both spaces being blocked from flow except for back and forth movement of the first solvent through the inner walls of the forward osmosis membranes (520).

When the raw material liquid (a) is introduced from one end of the forward osmosis membrane module (500), the raw material liquid (a) flows on the inside of each hollow fiber forward osmosis membrane (520), while flowing out from the other end as volume-reduced raw material liquid (c).

Similarly, when the draw solution (d) flows from the draw solution inlet (511), among the draw solution inlets at the side tubes of the housing (510), the draw solution (d) flows through the spaces on the outsides of the hollow fiber forward osmosis membranes (520) and flows out through the draw solution outlet (512).

This allows the raw material liquid (a) and draw solution (d) to contact through the forward osmosis membranes (520). The substances other than the valuable substance thus migrate from the raw material liquid (a) to the draw solution (d) due to the difference in osmotic pressure between the two liquids. Volume reduction takes place by this mechanism in the forward osmosis membrane method.

When each forward osmosis membrane (520) has a substrate layer and an active layer formed on one side of the substrate layer, the active layer is formed on the side of the substrate layer that contacts the raw material liquid, as mentioned above. Therefore, in the forward osmosis membrane module (500) shown in FIG. 1 wherein the raw material liquid (a) flows on the inside of each hollow fiber forward osmosis membrane, the active layer is preferably provided on the inner side of the hollow fiber substrate layer.

If the flow rate of the raw material liquid (a) and/or the flow rate of the draw solution (d) is high, the effect of the osmotic pressure difference on both sides of the forward osmosis membrane (520), and especially the active layer, is increased, and consequently the permeation volume of the first solvent per membrane area of the forward osmosis membrane increases.

In the forward osmosis membrane module (500) of FIG. 2, the raw material liquid (a) and draw solution (d) are both shown flowing in a parallel flow, but their flow may be a countercurrent flow instead.

The material of the housing (510) in the forward osmosis membrane module (500) of FIG. 2 is selected from the viewpoint of avoiding deterioration in chemical resistance, pressure resistance, heat resistance, impact resistance and weather resistance by the components in the raw material liquid (a) and draw solution (d). Examples for materials to be used in the housing (510) include resins and metals. From this viewpoint, the material is preferably selected from among resins such as polypropylene, polysulfones, polyethersulfone, polyvinylidene fluoride, polytetrafluoroethylene, perfluoroalkoxyalkanes, ABS resins, fiber-reinforced plastics and vinyl chloride resins; and metals such as stainless steel, brass and titanium.

The adhesive resin (530) in the forward osmosis membrane module (500) of FIG. 2 preferably has satisfactory mechanical strength and heat resistance at 100° C. Examples of resins to be used as the adhesive resin (530) include thermosetting epoxy resins, thermosetting urethane resins, ceramic type adhesives, and sealants obtained by melting polyethylene or low-melting-point metals. Epoxy resins are preferred from the viewpoint of heat resistance, and urethane resins are preferred from the viewpoint of handleability.

The method of adhesively anchoring the forward osmosis membranes (520) to the housing (510) may be a known method of adhesion for fabrication of hollow fiber membrane modules.

(Nanofiltration Method)

A nanofiltration method will now be explained as another example of the first treatment.

In a nanofiltration method, the raw material liquid is supplied to one side of the nanofiltration membrane and the raw material liquid supply side is pressurized. This results in permeating removal of primarily the first solvent in the raw material liquid through the nanofiltration membrane, causing volume reduction of the raw material liquid. The second solvent or accessory component remains in the raw material liquid.

A publicly known nanofiltration membrane may be used as the nanofiltration membrane.

The nanofiltration membrane may have any structural shape, such as a hollow fiber membrane shape, a tubular shape or a flat membrane shape. A hollow fiber nanofiltration membrane is preferred as it allows formation of a flow channel for passage of the raw material liquid and permeate (first solvent) without using a spacer, and allows uniform volume reduction. The nanofiltration method is preferably carried out using a nanofiltration membrane module comprising a plurality of hollow fiber nanofiltration membranes housed in a suitable housing.

Examples for the material of the nanofiltration membrane include polysulfones, polyethersulfone, polyvinylidene fluoride, polyacrylonitrile, polyethylene, polypropylene, cellulosic polymers, polyketones, polyamides, polyimides, polyetherether ketone and polybenzimidazole, as well as their crosslinked products, and it preferably has at least one of these as the main component.

For the housing of the nanofiltration membrane module and the rest of the module, the explanation given above for the forward osmosis membrane module may be applied, replacing "forward osmosis membrane" with "nanofiltration membrane".

(Evaporation Method)

An evaporation method will now be explained as yet another example of the first treatment.

An evaporation method is carried out by circulating a gas into a container holding a raw material liquid, preferentially gasifying the component in the raw material liquid that has greater vapor pressure (the first solvent), removing it out of the container and resulting in volume reduction of the raw material liquid. The components with lower vapor pressure (the second solvent or accessory component) remain in the raw material liquid.

The gas circulated through the container holding the raw material liquid may be air, nitrogen or argon, for example.

<Second Treatment>

The second treatment in the raw material liquid concentration method of the invention is treatment in which the concentration of the second solvent or accessory component in the raw material liquid is adjusted by dialysis using a dialysis membrane, to keep the component composition of the raw material liquid after volume reduction within a range so that the valuable substance does not denature, aggregate or precipitate.

Dialysis is used in the second treatment. It is most effective to use a molecular sieve membrane as the dialysis membrane from the viewpoint of effectively inhibiting permeation and dissipation of the valuable substance through the dialysis membrane.

One example of the second treatment in the system for reducing the volume of a raw material liquid of the invention will now be explained, as dialysis using a molecular sieve membrane as the dialysis membrane.

Figure 3:
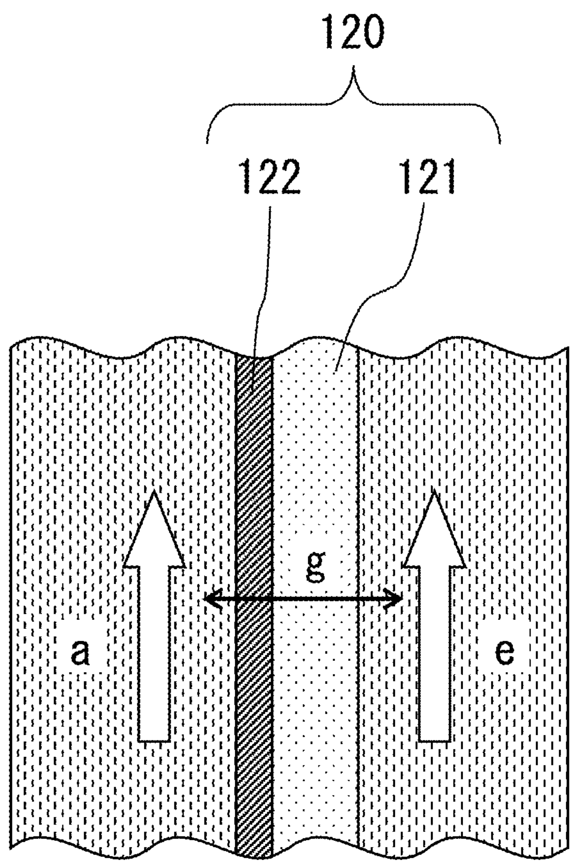
FIG. 3 is a conceptual drawing illustrating the mechanism of action in a dialysis method, as an example of second treatment in the method for reducing the volume of a raw material liquid according to the invention.

FIG. 3 is a schematic view showing the mechanism of action of dialysis using a dialysis membrane.

In FIG. 3, a raw material liquid (a) flows on one side of a dialysis membrane (120) while a dialysate (e) flows on the opposite side, the two liquids contacting through the dialysis membrane (120).

During this time, a difference between the concentration of the second solvent or accessory component (g) in the raw material liquid (a) and the concentration of the second solvent or accessory component (g) in the dialysate (e) causes migration of the second solvent or accessory component (g) from the concentrate into the diluted solution. Since migration is driven by the concentration difference between the second solvent or accessory component (g), the migration may take place in either direction.

In the second treatment of the system for reducing the volume of a raw material liquid of the invention, such migration causes the concentration of the second solvent or accessory component (g) in the raw material liquid (a) to approach the concentration of the dialysate (d), and therefore the component composition of the raw material liquid (a) is maintained within the desired range.

When a forward osmosis method has been employed as the first treatment, the draw solute in the draw solution may contaminate the raw material liquid in some cases. The second treatment in the method for reducing the volume of a raw material liquid of the invention has an effect of removing contaminating draw solute from the raw material liquid. In this case, since the draw solute is not present in the dialysate (e), the draw solute preferentially migrates from the raw material liquid (a) to the dialysate (e), resulting in effective removal of the draw solute from the raw material liquid.

The dialysis membrane (120) in FIG. 3 has a substrate layer (121) and an active layer (122) formed on one side of the substrate layer (121). The active layer (122) has an exceedingly dense structure that allows passage of small molecules while preventing passage of the valuable substance, and is formed on the side of the substrate layer (121) that is in contact with the raw material liquid (a).

The material used for the substrate layer (121) will generally be a porous membrane. The dialysate (d) permeates into the substrate layer (121) section of the dialysis membrane (120) composed of the porous membrane, with the raw material liquid (a) and dialysate (d) contacting through the active layer (122).

The material of the porous membrane forming the substrate layer may be selected from among widely used materials. However, a material that dissolves or swells in an organic solvent of the solvent in the raw material liquid and is unable to maintain the shapes of the membrane pores, cannot be used.

When the first treatment is volume reduction treatment using a membrane, preferably:

the permeability of the second solvent or accessory component through the dialysis membrane used for the second treatment, is greater than the permeability of the second solvent or accessory component through the membrane used for the first treatment.

A larger permeability of the second solvent or accessory component through the dialysis membrane is preferred to allow rapid migration of the second solvent or accessory component through the dialysis membrane, to aid in the effect of causing the concentration of the second solvent or accessory component to approach the concentration of the dialysate, and to effectively adjust the second solvent or accessory component concentration in the raw material liquid.

In this regard, the monomer used to form the active layer on the substrate layer is preferably selected so that the material of the active layer is a polyamide, from the viewpoint of allowing arbitrary control of the permeability of the second solvent or accessory component.

The material of the porous membrane forming the substrate layer and the method of forming a polyamide to compose the active layer may be same as explained above for the substrate layer and active layer of the forward osmosis membrane, respectively.

All or some of the polyfunctional acid halides used to form the active layer of the dialysis membrane may be polyfunctional acid halide compounds converted to acid anhydrides. Specific examples include trimellitic anhydride chloride, 3,3',4,4'-biphenyltetracarboxylic dianhydride, pyromellitic dianhydride, benzophenonetetracarboxylic dianhydride and diphenyl ether tetracarboxylic dianhydride.

All of some of the polyfunctional amines used to form the active layer of the dialysis membrane are preferably piperazines, for higher permeability of the second solvent or accessory component.

When the first treatment is carried out by a forward osmosis method, the forward osmosis membrane used for forward osmosis and the dialysis membrane used for dialysis in the second treatment both have a similar construction in terms of having a substrate layer composed of a porous membrane and an active layer composed of a polyamide, as mentioned above.

As also mentioned above, in regard to the permeability of the second solvent or accessory component in the raw material liquid, the permeability of the dialysis membrane is preferably greater than the permeability of the forward osmosis membrane.

It is possible to create a difference in permeability for the second solvent or accessory component for a forward osmosis and dialysis membrane composed of the same material, by selection of the monomers, adjustment of the interfacial polymerization conditions and post-treatment after interfacial polymerization, for example, when forming the active layer on the substrate layer.

For example, by using an aliphatic amine compound as the polyfunctional amine used for interfacial polymerization it is possible to increase the permeability for the second solvent or accessory component.

The dialysis membrane may have any structural shape, such as a hollow fiber membrane shape, a tubular shape or a flat membrane shape. A hollow fiber dialysis membrane is suitable as it allows formation of a flow channel for passage of the raw material liquid and dialysate, without using a spacer, and allows a uniform flow to be maintained.

When a hollow fiber dialysis membrane is used, the outer diameter of the hollow fiber membrane may be 300 μm or greater and 5,000 μm or less, for example, and preferably 350 μm or greater and 4,000 μm or less, while the inner diameter of the hollow fiber membrane may be 200 μm or greater and 4,000 μm or less, for example, and preferably 250 μm or greater and 1,500 μm or less. An inner diameter of less than 200 μm for the hollow fibers may result in precipitation, aggregation or denaturation of the valuable substance, for reasons that are not fully understood. If the inner diameter of the hollow fibers exceeds 4,000 μm, then when a plurality of dialysis membranes are modularized, the membrane area in the module will be too small and migration of the second solvent or accessory component concentration may not take place sufficiently.

The composition of the dialysate used in the dialysis is preferably a composition that allows the valuable substance to stably exist. A suitable composition for the dialysate should be set as appropriate depending on the chemical and physical properties of the valuable substance in the raw material liquid, but one candidate, as an example, is a dialysate with the same composition as the raw material liquid without the valuable substance.

From the viewpoint of avoiding adverse effects on the tubings and analytical instruments, the pH of the dialysate is preferably 1 or higher and 14 or lower, and more preferably 2 or higher and 13 or lower.

In dialysis, the driving force for migration of the second solvent or accessory component between the raw material liquid and dialysate is the concentration difference between the raw material liquid and the dialysate. For effective migration of the components, therefore, the liquid must be refreshed at the interface between the active layer in the dialysis membrane, and the raw material liquid or dialysate.

The raw material liquid and dialysate must therefore flow at a suitable flow rate on both sides of the dialysis membrane (120).

In FIG. 3, the raw material liquid (a) and draw solution (d) are shown flowing in a parallel flow, but they may be in a countercurrent flow instead.

Depending on the composition of the raw material liquid, the first solvent in the dialysate may be able to permeate the dialysis membrane and migrate to the raw material liquid by the osmotic pressure difference between the raw material liquid and the dialysate, increasing the volume of the raw material liquid. In such cases, pressurization of the raw material liquid in contact with the dialysis membrane can inhibit volume increase of the raw material liquid. The pressurization pressure of the raw material liquid is preferably 0.05 MPaG or greater, more preferably 0.1 MPaG or greater and even more preferably 0.2 MPaG or greater.

Figure 4:
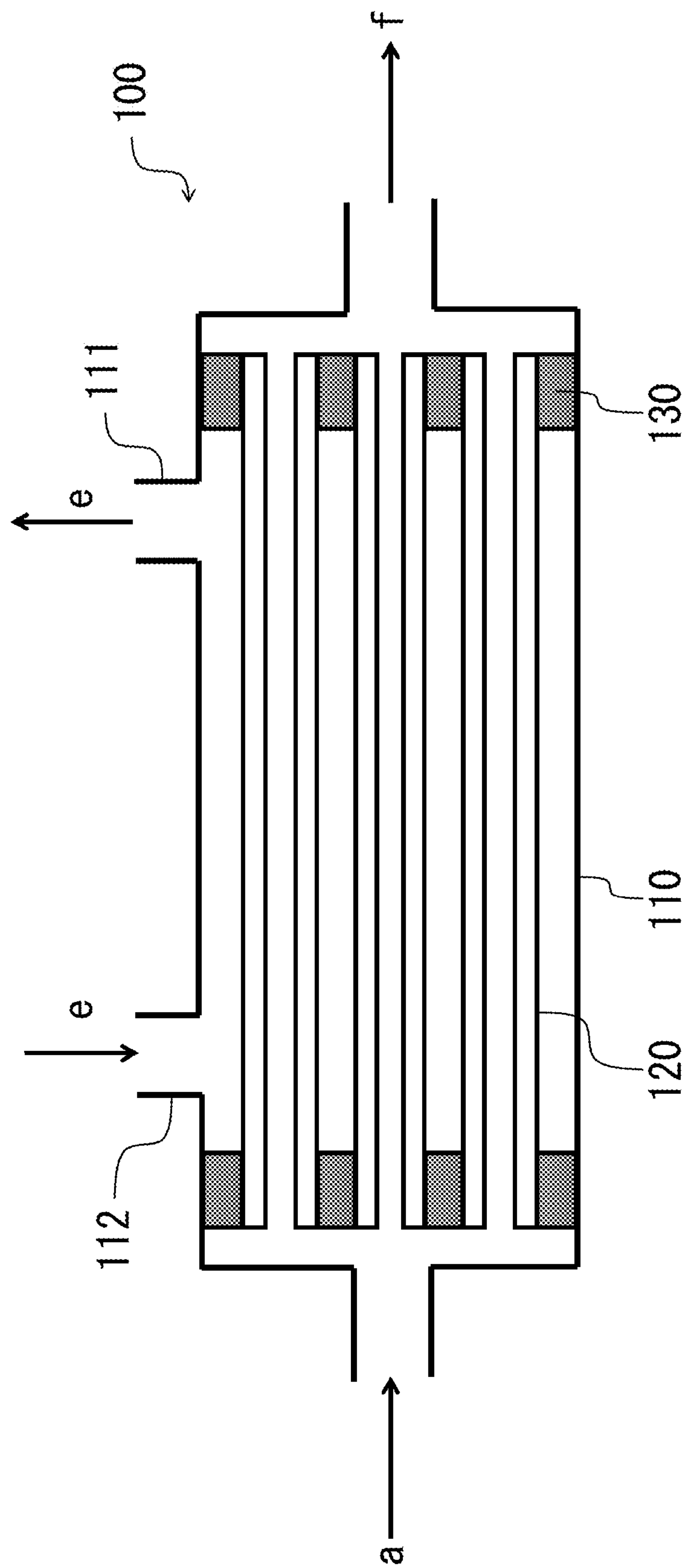
FIG. 4 is a simplified cross-sectional view illustrating an example of the structure of a dialysis membrane module used in the system for reducing the volume of a raw material liquid according to the invention.

FIG. 4 is a schematic view showing an example of the structure of a dialysis membrane module that is preferably used as the second unit for carrying out the second treatment in the method for reducing the volume of a raw material liquid of the invention.

In the dialysis membrane module (100) shown in FIG. 4, a plurality of hollow fiber dialysis membranes (120) are housed in a housing (110). Both ends of the dialysis membrane (120) are adhesively anchored to the housing (110) by an adhesive resin (130). Two housing side tubes are provided on the side wall of the housing (110). One of the housing side tubes is a dialysate inlet (111) while the other is a dialysate outlet (112).

The interior of the housing (110) is divided into two parts, a space through which the raw material liquid (a) flows and the space through which the dialysate (d) flows, by the outer walls of the dialysis membranes (120) and the adhesive resin (130), both spaces being blocked from flow except for back and forth movement of the second solvent or accessory component through the inner walls of the dialysis membranes (120).

When the raw material liquid (a) is introduced from one end of the dialysis membrane module (100), the raw material liquid (a) flows on the inside of each hollow fiber dialysis membrane (120), while flowing out from the other end as component concentration-adjusted raw material liquid (f).

Similarly, when the dialysate (d) flows from the dialysate inlet (111), among inlets at the side tubes of the housing (110), the dialysate (e) flows through the spaces on the outsides of the hollow fiber dialysis membranes (120) and flows out through the dialysate outlet (112).

This allows the raw material liquid (a) and dialysate (e) to contact through the dialysis membranes (120). During this time, the second solvent or accessory component (g) migrates from the raw material liquid (a) to the dialysate (e) or from the dialysate (d) to the raw material liquid (a), depending on the size of their concentrations in the raw material liquid (a) and dialysate (d). The concentration of the second solvent or accessory component is adjusted by this mechanism in dialysis.

If the flow rate of the raw material liquid (a) and/or the flow rate of the dialysate (e) is high, the effect of the concentration difference on both sides of the dialysis membrane (120), and especially the active layer, is increased, and consequently the amount of movement of the second solvent or accessory component per membrane area of the dialysis membrane increases.

In the dialysis membrane module (100) of FIG. 4, the raw material liquid (a) and dialysate (e) are both shown flowing in a parallel flow, but their flow may be a countercurrent flow instead.

The materials of the housing (110) and adhesive resin (130) in the dialysis membrane module (100) of FIG. 4, as well as the method of adhesively anchoring the dialysis membranes (120) to the housing (110), may be the same as explained above for the forward osmosis membrane module (500) of FIG. 2.

<Embodiments of First Treatment and Second Treatment>

The order of carrying out the first treatment and second treatment may be as desired. For example:

- the second treatment may be carried out after the first treatment;
- the first treatment may be carried out after the second treatment; or
- the first treatment and second treatment may be carried out simultaneously.

Simultaneously carrying out the first treatment and second treatment means that the first treatment and second treatment are carried out in parallel, for example, with the raw material liquids being mixed after the respective treatments.

When the first treatment and second treatment are carried out in a desired order, the tubing for supply of the raw material liquid to one treatment and the tubing for supply of the raw material liquid to the other treatment may be connected in series.

When the first treatment and second treatment are carried out in parallel, the tubing for supply of the raw material liquid to the first treatment and the tubing for supply of the raw material liquid to the second treatment may be connected in parallel, for example.

The first treatment and second treatment are preferably carried out in a cyclical manner. An example of a preferred method is one in which:

- a procedure of storing the raw material liquid in a raw material liquid tank, taking out a portion of the raw material liquid in the raw material liquid tank and supplying it to the first treatment and second treatment in that order, and then returning the raw material liquid treated by the first treatment and second treatment to the raw material liquid tank, is repeated;
- a procedure of storing the raw material liquid in a raw material liquid tank, taking out a portion of the raw material liquid in the raw material liquid tank and supplying it to the second treatment and first treatment in that order, and then returning the raw material liquid treated by the second treatment and first treatment to the raw material liquid tank, is repeated;
- a procedure of storing the raw material liquid in a raw material liquid tank, and
- repeating a procedure of taking out a portion of the raw material liquid in the raw material liquid tank and supplying it to the first treatment, and returning the raw material liquid treated by the first treatment to the raw material liquid tank, and
- repeating a procedure of taking out a portion of the raw material liquid in the raw material liquid tank and supplying it to the second treatment, and returning the raw material liquid treated by the second treatment to the raw material liquid tank,
- in parallel (simultaneously), is repeated.

When the first treatment and second treatment are carried out in a cyclical manner, preferably the concentration of at least one of the components in the raw material liquid subjected to cyclical volume reduction is measured and the obtained measured value is used for deciding change in execution, halting or the operating conditions of either or both of the first treatment and second treatment.

For example, when the concentration of the first solvent in the raw material liquid is about to fall below the lower limit for the suitable range based on component analysis, the first treatment may be paused or the treatment conditions for the first treatment may be tempered.

Conversely, when the concentration of the first solvent in the raw material liquid is about to rise above the upper limit for the suitable range, the treatment conditions for the first treatment may be increased in severity.

When the concentration of the second solvent or accessory component in the raw material liquid is about to fall outside the suitable range, the concentration of the second solvent or accessory component in the dialysate used for the second treatment may be changed. The speed of volume reduction will tend to be faster in the latter stage of volume reduction than in the early stage of volume reduction. In the latter stage of volume reduction, therefore, the concentration of the second solvent or accessory component in the dialysate increases during circulation, potentially lowering the efficiency for adjustment of the concentration of the second solvent or accessory component in the raw material liquid. In such cases, the dialysate may be discarded while being circulated during volume reduction, for example, and replaced with dialysate having the initial composition, to increase the efficiency for adjustment of the concentration of the second solvent or accessory component in the raw material liquid.

The concentration of at least one of the components in the raw material liquid can be determined using measurement results from specific gravity measurement, pH measurement, conductivity measurement, liquid level measurement, optical rotation measurement, refractive index measurement, near-infrared spectroscopic analysis or weight measurement of the raw material liquid, for example.

When the raw material liquid has been reduced in volume to the desired volume reduction factor, both the first treatment and second treatment are halted to complete volume reduction of the raw material liquid.

The volume reduction factor can be ascertained by an appropriate method such as weight measurement or liquid level measurement of the raw material liquid, for example.

The method of component analysis of the raw material liquid (e) after final volume reduction may be appropriately selected according to the type of component in the volume-reduced raw material liquid.

For example, a publicly known analysis method such as ICP-MS (inductively coupled plasma-mass spectrometry), nuclear magnetic resonance spectroscopy (NMR), gas chromatography/mass spectrometry (GC/MS), a colorimetric method, a fluorescence method or high performance liquid chromatography (HPLC) may be used.

In order to inhibit precipitation and denaturation of the valuable substance in the raw material liquid while achieving a high volume reduction factor, it is preferred for the first treatment and second treatment to be carried out in parallel. Carrying out the first treatment and second treatment in parallel will help to keep the composition of the raw material liquid in the prescribed range during volume reduction.

<System for Reducing Volume of Raw Material Liquid>

Another aspect of the invention provides a system for reducing the volume of a raw material liquid.

The system for reducing the volume of a raw material liquid of the invention is a system for carrying out the method for reducing the volume of a raw material liquid of the invention.

The system for reducing the volume of a raw material liquid of the invention is therefore a system for reducing the volume of a raw material liquid in which a raw material liquid including at least a valuable substance and a first solvent is reduced in volume, wherein the raw material liquid:

further includes an accessory component in addition to the valuable substance and first solvent, or includes a mixed solvent of the first solvent and a second solvent as a solvent, and the system for reducing the volume of a raw material liquid is a system combining:

a first unit in which the first solvent is removed from the raw material liquid, and a second unit in which the concentration of the second solvent or the accessory component in the raw material liquid is adjusted by dialysis using a dialysis membrane.

The details regarding the system for reducing the volume of a raw material liquid of the invention are as explained above for the method for reducing the volume of a raw material liquid of the invention, either directly or as amended according to the understanding of a person skilled in the art so as to apply to a "system".

The construction of the system for reducing the volume of a raw material liquid of the invention will now be described in greater detail with reference to the accompanying drawings.

Examples of the construction of the system for reducing the volume of a raw material liquid of the invention are shown in FIG. 5 to FIG. 8.

Figure 5:
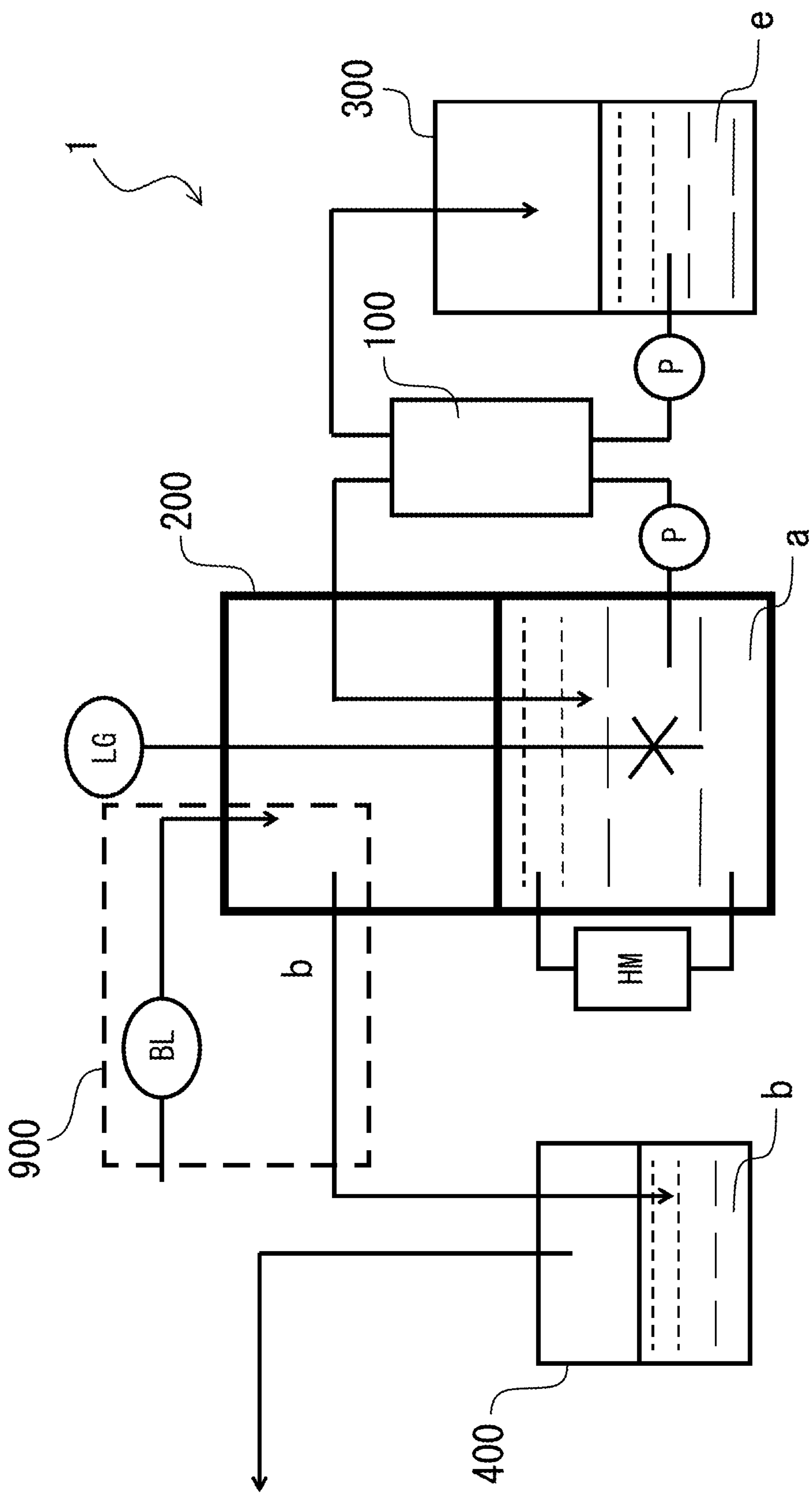
FIG. 5 is a conceptual drawing illustrating an example of the system for reducing the volume of a raw material liquid according to the invention.

The system for reducing the volume of a raw material liquid of FIG. 5 is an example of applying an evaporation unit, as the first unit, wherein a gas is flowed into a container storing the raw material liquid to cause the first solvent in the raw material liquid to evaporate and migrate out of the container.

The system for reducing the volume of a raw material liquid (1) of FIG. 5 has an evaporation unit (900), a dialysis membrane module (100), a raw material liquid tank (200), a dialysate tank (300) and a trap (400).

The evaporation unit (900) has a blower (BL) to cause flow of the gas in the raw material liquid tank (200), and tubing to feed the evaporated first solvent (b) into the trap (400).

In the system for reducing the volume of a raw material liquid (1) of FIG. 5, the gas (such as air) is fed into the raw material liquid tank (200) by the blower (BL) provided in the evaporation unit (900). The introduced gas, and the first solvent (b) evaporated by the gas, are discharged out of the raw material liquid tank (200), resulting in volume reduction of the raw material liquid.

The vapor of the first solvent (b) discharged from the raw material liquid tank (200) may be collected by being reconverted to liquid in the trap (400).

In a method in which the evaporation unit (900) is used as the first unit and gas is fed into the raw material liquid tank (200), volume reduction takes place at the liquid surface of the raw material liquid (a) and its vicinity, and therefore the composition of the raw material liquid (a) can potentially differ depending on its location in the raw material liquid tank (200). In this regard, providing a stirrer (not shown) in the raw material liquid tank (200) can maintain a uniform composition for the raw material liquid (a) in the raw material liquid tank (200), allowing volume reduction to be achieved while inhibiting precipitation, aggregation and denaturation of the valuable substance.

In the system for reducing the volume of a raw material liquid (1) of FIG. 5, the component with high vapor pressure (first solvent) is preferentially removed by the evaporation unit (900). In the raw material liquid (a) that has been subjected to volume reduction by the evaporation unit (900), therefore, the concentrations of the components with low vapor pressure (such as the valuable substance, and the second solvent or accessory component) will generally be increased.

The system for reducing the volume of a raw material liquid (1) of FIG. 5 is also provided with a dialysis membrane module (100) for dialysis as the second unit, in addition to the evaporation unit (900).

In the system for reducing the volume of a raw material liquid (1) of FIG. 5, the raw material liquid (a) is fed at a suitable flow rate into one space of the dialysis membrane module (100) (such as the space formed by the insides of the hollow fiber membranes) by a pump (P) at the bottom of the raw material liquid tank (200) that has been filled with the raw material liquid (a). The flow rate of the raw material liquid (a) may be manually or automatically adjusted by a flow meter (not shown), for example. The dialysate (d), on the other hand, is supplied into the other space (such as the space formed by the outsides of the hollow fiber membranes) of the dialysis membrane module (100) by a pump (P) from the dialysate tank (300) filled with the dialysate (d). The concentration difference between the raw material liquid (a) and dialysate (d) causes the concentration of the second solvent or accessory component in the raw material liquid (a) to be corrected to approach the concentration of the second solvent or accessory component in the dialysate (d). The concentration-corrected raw material liquid (a) leaves the dialysis membrane module (100) and is circulated back to the raw material liquid tank (200).

Due to the function of the dialysis membrane module (100), the concentration of the second solvent or accessory component in the dialysate (d) changes as the concentration of the second solvent or accessory component in the raw material liquid (a) is corrected. For suitable correction of the concentration of the second solvent or accessory component during continuous operation, therefore, it is necessary to either successively refresh the dialysate (d), or to regenerate the dialysate with an apparatus having a function of restoring the concentration of the second solvent or accessory component in the dialysate (d) to a predetermined value. FIG. 5 does not show the regenerating apparatus.

Figure 6:
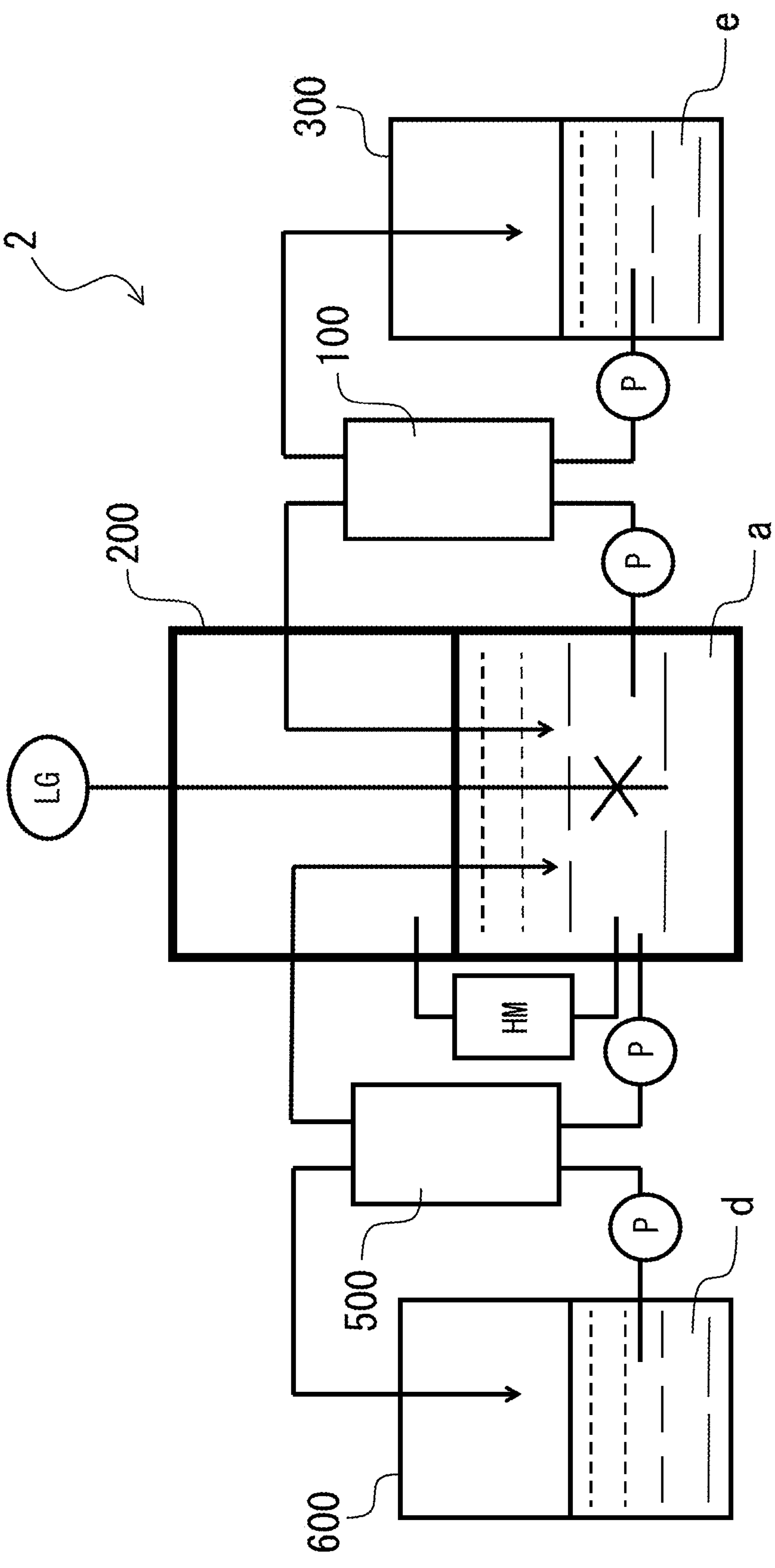
FIG. 6 is a conceptual drawing illustrating another example of the system for reducing the volume of a raw material liquid according to the invention.

The system for reducing the volume of a raw material liquid of FIG. 6 is an example using a forward osmosis membrane module in a forward osmosis method, as the first unit.

The system for reducing the volume of a raw material liquid (2) of FIG. 6 has a forward osmosis membrane module (500), a raw material liquid tank (200), a draw solution tank (600), a dialysis membrane module (100) and a dialysate tank (300).

In the system for reducing the volume of a raw material liquid (2) of FIG. 6, the forward osmosis membrane module (500) and dialysis membrane module (100) are connected in parallel to the raw material liquid tank (200).

Adjustment of the concentration of the second solvent or accessory component by the dialysis membrane module (100) is carried out by the same method as in the system for reducing the volume of a raw material liquid (1) of FIG. 5.

In volume reduction using the forward osmosis membrane module (500), the raw material liquid (a) is supplied at a suitable flow rate into one space of the forward osmosis membrane module (500) (such as the space formed by the insides of the hollow fiber membranes), by a pump (P) at the bottom of the raw material liquid tank (200). After having passed into the hollow fiber membranes, the raw material liquid (a) is circulated back to the raw material liquid tank (200). The return location is preferably a location far from the sampling location where the liquid is supplied to the forward osmosis membrane module (500), and at the bottom section of the raw material liquid tank (200). If the liquid is returned at a location far from the sampling location it will be possible to prevent the concentration of the second solvent or accessory component in the raw material liquid (a) from excessively increasing by a short path. In addition, returning to the bottom section of the raw material liquid tank can prevent precipitation and loss of the valuable substance in the raw material liquid (a) at the wall faces of the raw material liquid tank (200).

In the other space of the forward osmosis membrane module (500) (for example, the space formed by the outsides of the hollow fiber distillation membranes), the draw solution (d) having higher osmotic pressure than the raw material liquid (a) is introduced using a pump (P).

The first solvent thus migrates from the raw material liquid (a) to the draw solution (d) side by the difference in osmotic pressure between the raw material liquid (a) and draw solution (d), resulting in volume reduction of the raw material liquid (a). The volume reduced raw material liquid (a) leaves the forward osmosis membrane module (500) and is circulated back to the raw material liquid tank (200). The draw solution (d) increases in volume by inclusion of the first solvent from the raw material liquid (a). The draw solution tank (600) must therefore have sufficiently large capacity, or must be able to discharge a portion out of the draw solution tank (600) by overflow. FIG. 6 does not show the apparatus used for discharge of the draw solution (d) out of the draw solution tank (600).

Figure 7:
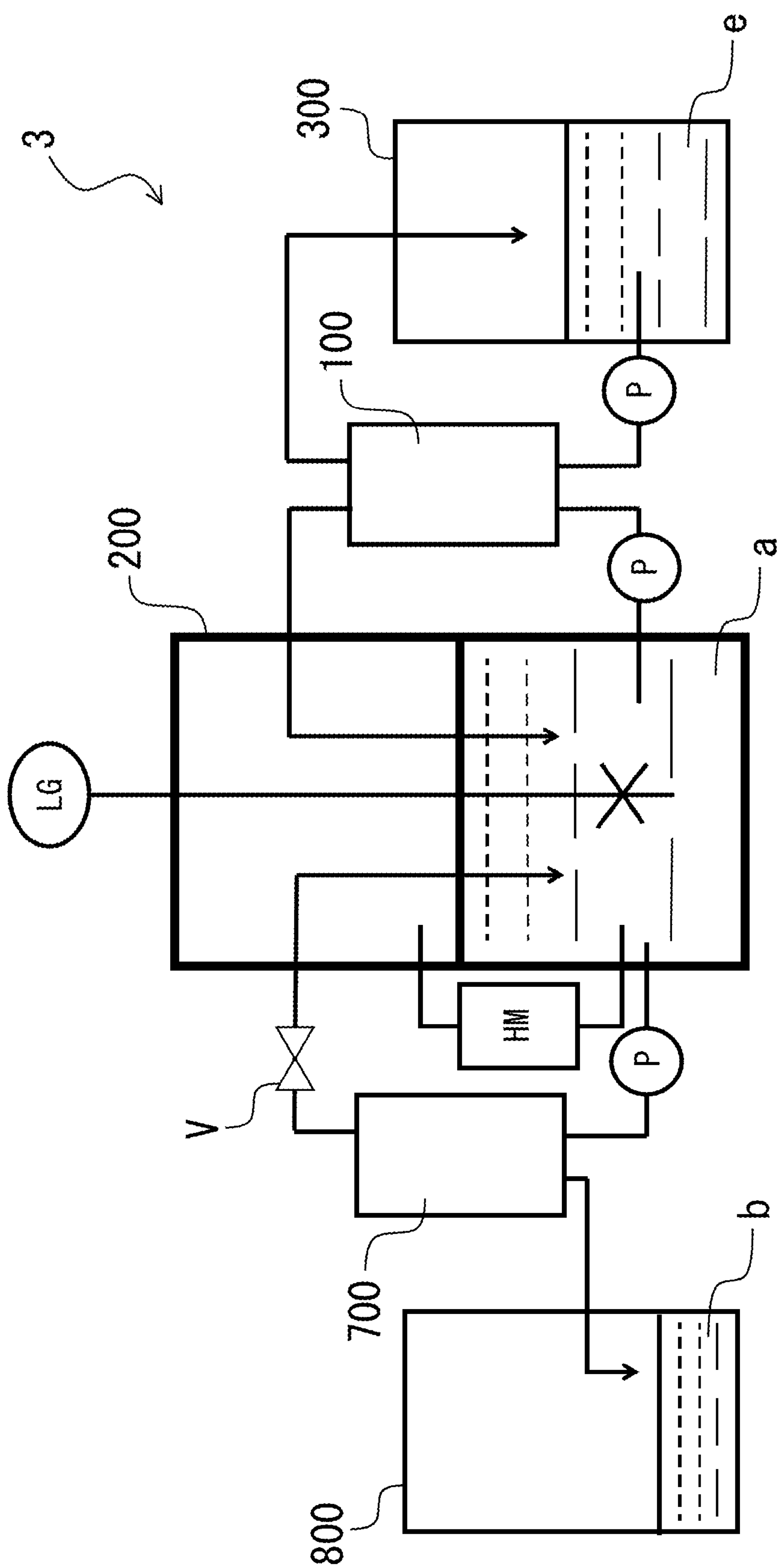
FIG. 7 is a conceptual drawing illustrating yet another example of the system for reducing the volume of a raw material liquid according to the invention.

The system for reducing the volume of a raw material liquid of FIG. 7 is an example using a nanofiltration module in a nanofiltration membrane method, as the first unit.

The system for reducing the volume of a raw material liquid (3) of FIG. 7 has a nanofiltration membrane module (700), a raw material liquid tank (200), a permeate tank (800), a dialysis membrane module (100) and a dialysate tank (300).

In the system for reducing the volume of a raw material liquid (3) of FIG. 7, the nanofiltration membrane module (700) and dialysis membrane module (100) are connected in parallel to the raw material liquid tank (200).

Adjustment of the concentration of the second solvent or accessory component by the dialysis membrane module (100) is carried out by the same method as in the system for reducing the volume of a raw material liquid (1) of FIG. 5.

In volume reduction using the nanofiltration membrane module (700), the raw material liquid (a) is supplied at a suitable flow rate into one space of the nanofiltration membrane module (700) (such as the space formed by the insides of the hollow fiber membranes), by a pump (P) at the bottom of the raw material liquid tank (200). After having passed through the insides of the hollow fiber membranes, the raw material liquid (a) has its flow rate throttled by a valve (V), whereby pressure is applied to the nanofiltration membrane module (700). The pressure causes the permeate (first solvent) that has passed through the nanofiltration membrane to be collected in the permeate tank (800). The raw material liquid (a) that has passed through the valve (V) is circulated back to the raw material liquid tank (200). The return location is preferably a location far from the sampling location where the liquid is supplied to the nanofiltration membrane module (700), at the bottom section of the raw material liquid tank (200). If the liquid is returned at a location far from the sampling location it will be possible to prevent the concentration of the second solution or accessory component in the raw material liquid (a) from excessively increasing by a short path. In addition, returning to the bottom section of the raw material liquid tank can prevent precipitation and loss of the valuable substance in the raw material liquid (a) at the wall faces of the raw material liquid tank (200).

Permeation of the first solvent from the nanofiltration membrane under pressure results in volume reduction of the raw material liquid (a). The volume reduced raw material liquid (a) leaves the nanofiltration membrane module (700) and returns back to the raw material liquid tank (200) through the valve (V).

Figure 8:
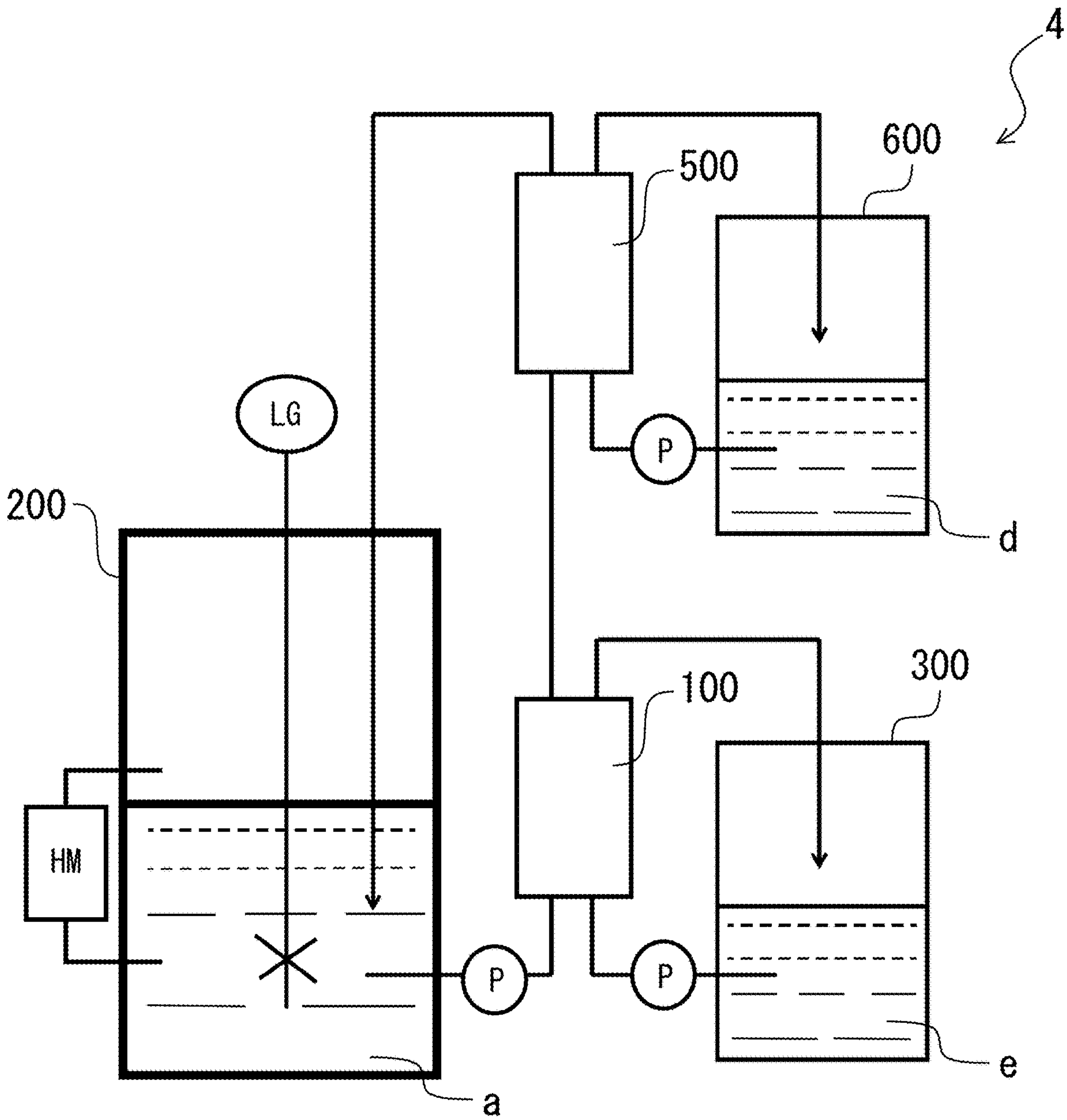
FIG. 8 is a conceptual drawing illustrating yet another example of the system for reducing the volume of a raw material liquid according to the invention.

The system for reducing the volume of a raw material liquid (4) of FIG. 8 is a different embodiment using a forward osmosis membrane module (500) as the first volume reduction unit, being a system having a dialysis membrane module (100) as the second unit and the forward osmosis membrane module (500) as the first unit, situated in series in that order in the direction of flow of the raw material liquid (a). In the system for reducing the volume of a raw material liquid (4) of FIG. 8, the raw material liquid (a) removed from the bottom section of the raw material liquid tank (200) passes through the forward osmosis membrane module (500) after having passed through the dialysis membrane module (100) first. However, the construction may instead be such that the liquid passes through the dialysis membrane module (100) after having passed through the forward osmosis membrane module (500) first.

Figure 9:
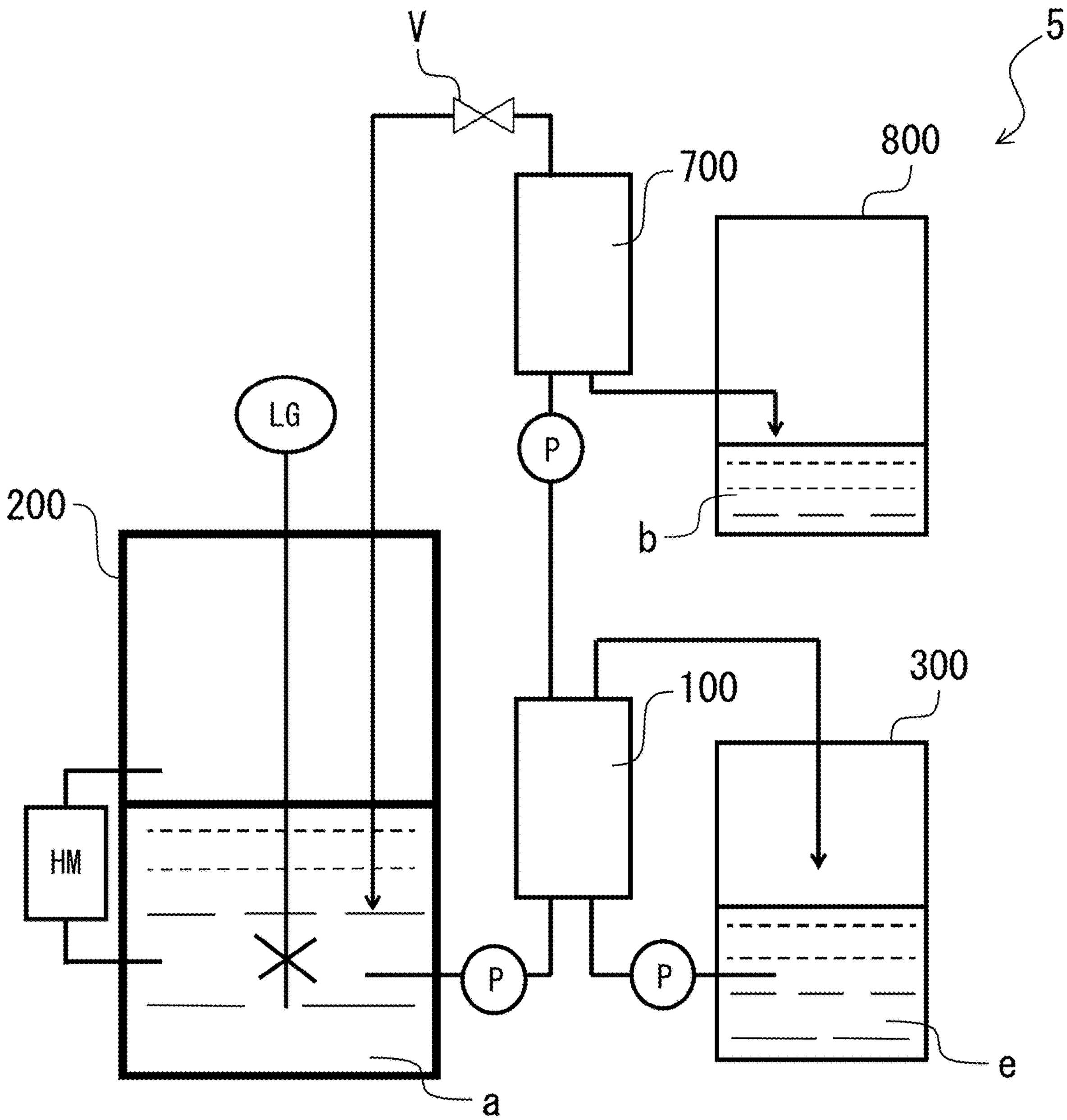
FIG. 9 is a conceptual drawing illustrating yet another example of the system for reducing the volume of a raw material liquid according to the invention.

The system for reducing the volume of a raw material liquid (5) of FIG. 9 is a different embodiment using a nanofiltration membrane module (700) as the first volume reduction unit, being a system having a dialysis membrane module (100) as the second unit and the nanofiltration membrane module (700) as the first unit, situated in series in that order in the direction of flow of the raw material liquid (a). In the system for reducing the volume of a raw material liquid (5) of FIG. 9, the raw material liquid (a) removed from the bottom section of the raw material liquid tank (200) passes through the nanofiltration membrane module (700) after having passed through the dialysis membrane module (100) first. However, the construction may instead be such that the liquid passes through the dialysis membrane module (100) after having passed through the nanofiltration membrane module (700) first.

In all of the systems for reducing the volume of a raw material liquid shown in FIG. 5 to FIG. 9, removing the raw material liquid (a) from the bottom section of the raw material liquid tank (200) and returning it to the bottom section of the raw material liquid tank (200) is effective for preventing adhesion and loss of the valuable substance in the raw material liquid (a) onto the tank wall face. Providing a stirrer inside the raw material liquid tank (200) is also effective for achieving stable volume reduction.

In the systems for reducing the volume of a raw material liquid of FIG. 5 to FIG. 9, the specific gravity of the raw material liquid (a) can be monitored using a hydrometer (HM). It is thereby possible to monitor the concentration of the second component or accessory component in the raw material liquid (a). If necessary, operation of the first or second unit may be started or stopped, or the operating conditions may be changed, to allow volume reduction while adjusting the composition of the raw material liquid (a) to within a range so that the valuable substance does not precipitate, aggregate or denature.

The degree of volume reduction of the raw material liquid (a) can be ascertained by measuring the volume of the raw material liquid (a) using a level gauge (LG). The volume reduction may be stopped when the final target volume reduction factor has been reached.

The properties of the raw material liquid (a) (for example, the concentration of at least one of the components in the raw material liquid) may be monitored by specific gravity measurement, pH measurement, conductivity measurement, optical rotation measurement, refractive index measurement, ultraviolet light analysis, visible light analysis, infrared light analysis or near-infrared light analysis. The measurement results from one or more of such analyses may be used to determine the concentration of at least one component in the raw material liquid. By simultaneously monitoring these results and the value measured by the level gauge and the weight of the liquid, and changing operation or halting or the operating conditions of the first or second unit as necessary, it is possible to carry out volume reduction while maintaining the concentration of the second solvent or accessory component in the raw material liquid (a).

The concentration of the second solvent or accessory component in the raw material liquid (a) is more preferably estimated by a predictive model obtained by publicly known AI technology such as deep learning using regression analysis, classification, clustering and neural networking, or a combination thereof, to allow more high precision estimation of the concentration.

With this method, the concentration of the second solvent or accessory component in the raw material liquid (a) can be monitored with high precision and the operating conditions can be appropriately manipulated, to allow volume reduction to be carried out while more precisely keeping the concentration of the second solvent or accessory component within the suitable range. The risk of precipitation, aggregation or denaturation of the valuable substance can therefore be even further reduced.

EXAMPLES

Examples concretely illustrating the construction and effect of the invention will now be described, with the understanding that this embodiment is not in any way limited by the Examples.

<Dialysis Membrane Module 1>

A polyethersulfone hollow fiber ultrafiltration membrane with an inner diameter of 0.7 mm and an outer diameter of 1.0 mm was used as the substrate layer. After packing 130 of such hollow fiber ultrafiltration membranes into a cylindrical plastic housing with a diameter of 2 cm and a length of 10 cm, both ends were anchored with an adhesive to fabricate a substrate layer module having an effective membrane inner surface area of about 0.02 $m^2$.

After placing 2.5 g of piperazine and 0.8 g of sodium lauryl sulfate into a 0.5 L container, 489.2 g of purified water was further added to dissolution, preparing 0.5 kg of a first solution to be used for interfacial polymerization.

Next, 0.8 g of trimesoyl chloride was placed in a separate 0.5 L container, and 399.2 g of n-hexane was added and dissolved to prepare 0.4 kg of a second solution to be used for interfacial polymerization.

The solutions were passed through the support layer module in order as the first solution and second solution, so as to pass through the insides of the hollow fiber ultrafiltration membranes, conducting interfacial polymerization on the inner surfaces of the hollow fiber ultrafiltration membranes to form an active layer on the support layer, thereby producing hollow fiber dialysis membranes.

The insides of the obtained hollow fiber dialysis membranes were then washed with purified water to fabricate a dialysis membrane module 1 housing 130 hollow fiber dialysis membranes, each having an active layer made of polyamide on the inner surface of a support layer made of a polyethersulfone hollow fiber ultrafiltration membrane.

<Forward Osmosis Membrane Module 1>

A module having an active layer made of polyamide on the inner surface of a support layer made of a polyethersulfone hollow fiber ultrafiltration membrane, was fabricated in the same manner as the dialysis membrane module, except that 10 g of m-phenylenediamine was used instead of 2.5 g of piperazine for preparation of the first solution. Hot water at 85° C. was then flowed for 30 minutes in the spaces inside the hollow fibers, after which water at 20° C. was flowed for 30 minutes. The module was then placed in an autoclave (ES-315 by Tomy Seiko Co., Ltd.) and high-temperature water vapor at 125° C. was supplied for 4 hours for heat treatment, after which water at 20° C. was flowed through the spaces inside the hollow fibers for 30 minutes or longer for washing, to fabricate a forward osmosis membrane module 1 housing 130 hollow fiber forward osmosis membranes.

<Dialysis Membrane Module 2>

A module fabricated in the same manner as "forward osmosis membrane module 1" above was used as "dialysis membrane module 2".

<Nanofiltration Membrane Module 1>

A module fabricated in the same manner as "forward osmosis membrane module 1" above was used as "nanofiltration membrane module 1".

<Evaporation Unit>

A blower (BL) for feeding of air into the raw material liquid tank (200), tubing for discharge of introduced gas and a first solvent (b) evaporated by the gas, out of the raw material liquid tank (200), and a trap (400) for storage of the first solvent (b) conveyed through the tubing, were used to fabricate an evaporation unit 1 having the same construction as the evaporation unit (900) shown in FIG. 5.

<Membrane Module for Membrane Distillation 1>

A PVDF porous hollow fiber membrane having an inner diameter of 0.7 mm, an outer diameter of 1.3 mm, an average pore diameter of 0.21 μm determined according to ASTM-F316-86, a maximum pore diameter of 0.29 μm and a void percentage of 72% was cut to a length of 15 cm.

A plurality of the obtained hollow fiber membranes were used to fabricate a membrane module for membrane distillation 1.

For fabrication of the membrane modules, a thermosetting epoxy resin was used as the adhesive resin and the hollow fiber membranes were adhesively anchored inside the housing by centrifugal bonding. Adjustment was made so that the lengths of the parts of the hollow fiber membranes not embedded in the adhesive resin were about 10 cm and the total membrane area of the inner surfaces of the hollow fiber membranes was about 0.02 $m^2$.

Two membrane modules were fabricated with the same specifications.

FS-392B by Fluorotechnology Co. at 3-fold concentration was passed through the space on the outsides of the hollow fiber membranes of the membrane module, coating and drying it onto the outsides of the hollow fiber membranes to obtain a membrane module for membrane distillation 1.

One of the membrane modules for membrane distillation 1 obtained by this method was disassembled and the porous hollow fiber membrane was analyzed, measuring the contact angle. The water contact angle of each porous hollow fiber membrane was determined by dropping 2 μL of purified water under conditions with a temperature of 23° C. and a relative humidity of 50%, and calculating the angle formed between the droplet and the hollow fiber membrane outer surface by image analysis. Measurement was conducted 5 times and the number-average value was calculated. The contact angle of the hollow fiber membrane outer surface was 132°, confirming very strong hydrophobicity.

One of the remaining membrane modules for membrane distillation 1 was used for Comparative Example 3.

<Measurement of Molecular Cutoff>

A 0.002 wt % aqueous solution of rhodamine B (molecular weight: 479) was used as a test supply solution, for measurement of the molecular cutoff of the dialysis membrane module 1 and forward osmosis membrane module 1.

Filtration was initiated under conditions with the test supply solution circulating through the space formed insides of the hollow fibers of each module at an average linear speed of 4 cm/sec and a pressure of 0.2 MPaG. The filtration was continued for 20 minutes, and the filtrate was sampled when the state stabilized.

When the absorbance of the sampled filtrate was measured at a wavelength of 552 nm to examine the concentration of rhodamine B in the filtrate, both the dialysis membrane module 1 and the forward osmosis membrane module 1 had rhodamine B concentrations of 1/10 or lower in the test supply solution.

This result signifies that the molecular cutoff was 479 or lower for both the dialysis membrane module 1 and forward osmosis membrane module 1.

It was thus confirmed that both the dialysis membrane module 1 and forward osmosis membrane module 1 were molecular sieve membrane modules.

<Measurement of Permeability>

The permeability of the obtained dialysis membrane module 1 and forward osmosis membrane module 1 was measured using water as the first solvent, acetonitrile as the second solvent and acetic acid as the accessory component.

Evaluation of the acetonitrile permeability was carried out using water as the reference solution and a 1 M aqueous acetonitrile solution at a concentration of 1 mol/L as the test solution. Both solutions were flowed through and in a parallel flow and circulated, with the test solution at an average linear speed of 0.04 m/sec through space formed by the insides of the hollow fibers in each module and the reference solution at an average linear speed of 0.025 m/sec through the space formed by the outsides of the hollow fibers. At 20 minutes after the start of circulation, the acetonitrile concentration in the reference solution was measured to quantify the amount of acetonitrile passing from the test solution through the hollow fiber membranes into the reference solution. The obtained value (g) was divided by the product ($m^2 \cdot h \cdot M$) of the initial concentration of the test solution (M=mol/L), and the membrane area ($m^2$) and circulation time (h) of each module, to obtain the permeability.

The acetic acid permeability was evaluated in the same manner as above, except that the test solution used was an aqueous acetic acid solution at 1 mol/L concentration.

The results are shown in Table 1.

TABLE 1

| Module | Permeability ($g/(m^2 \cdot h \cdot M)$) Acetonitrile | Acetic acid |
|---|---|---|
| Dialysis membrane module 1 | 322 | 168 |
| Forward osmosis membrane module 1 | 217 | 59 |

Example 1

In Example 1, the system for reducing the volume of a raw material liquid (2) shown in FIG. 6 was used for the first treatment by the forward osmosis method, with the fabricated forward osmosis membrane module 1 as the forward osmosis membrane module (500).

The raw material liquid (a) used was a solution comprising 0.2 wt % of glutathione disulfide as the valuable substance, 298.2 g of water as the first solvent, 298.2 g of acetonitrile as the second solvent and 3.6 g of acetic acid as the accessory component. The initial concentration of acetonitrile in the solvent of the raw material liquid (a) was 50 wt %.

A raw material liquid tank (200) with a volume of 1,000 mL was filled with 600 g of the raw material liquid (a). The draw solution tank (600) was filled with 1,200 g of an aqueous isopropanol solution with a 50 wt % concentration, as the draw solution (d).

The dialysate tank (300) was further filled with 1,200 g of water, as the dialysate (e).

For the forward osmosis method as the first treatment, the raw material liquid (a) and the draw solution (d) were circulated through the forward osmosis membrane module (500) as the first unit. The flow rate of the raw material liquid (a) was 120 mL/min, the flow rate of the draw solution (d) was 240 mL/min, and both liquids were circulated in a parallel flow.

For dialysis as the second treatment, the raw material liquid (a) and dialysate (e) were circulated through the dialysis membrane module (100) as the second unit. The flow rate of the raw material liquid (a) was 120 mL/min, the flow rate of the dialysate (e) was 240 mL/min, and both liquids were circulated in a parallel flow.

The dialysate was refreshed at 4.7 hours after the start of operation. That is, the total amount of the dialysate in the dialysate tank (300) was discarded, and the tank was filled with 1,200 g of fresh water.

After refreshment of the dialysate, operation was continued for a total of 8 hours of operation, which resulted in a raw material liquid (a) mass of 46.2 g, reaching a volume reduction factor of 13-fold. Operation was halted at this point.

The glutathione disulfide concentration of the raw material liquid (a) was analyzed by ICP-MS, and the yield was calculated. The glutathione disulfide yield was 99%.

A small amount of raw material liquid (a) was extracted every hour after the start of operation, monitoring the acetonitrile concentration by gas chromatography, whereby it was found that the acetonitrile concentration in the solvent of the raw material liquid (a) was lowered from 50 wt % to 31 wt % of the initial concentration 120 minutes after the start of operation, maintaining a water-rich composition thereafter.

This confirmed that the method of the invention achieved volume reduction of the raw material liquid while maintaining the solvent composition of the raw material liquid in the desired range, and achieved volume reduction of the raw material liquid without impairment of the valuable substance.

Examples 2 to 6

Operation was carried out in the same manner as Example 1, except that the composition of the raw material liquid and the dialysate (e) circulated through the dialysis membrane module (100) as the second unit were changed as listed in Table 2.

Example 7

Operation was carried out in the same manner as Example 1, except that a dialysis membrane module 2 was used as the dialysis membrane module (100) serving as the second unit.

Example 8

Operation was carried out in the same manner as Example 1, except that in Example 8, the first treatment was carried out by a nanofiltration method, the system for reducing the volume of a raw material liquid (3) shown in FIG. 7 was used, and the fabricated nanofiltration membrane module 1 was used as the nanofiltration membrane module (700).

Example 9

Operation was carried out in the same manner as Example 1, except that in Example 9, the first treatment was carried out by an evaporation method, the system for reducing the volume of a raw material liquid (1) shown in FIG. 5 was used, the fabricated evaporation unit 1 was used as the evaporation unit (900), and the composition of the raw material liquid and the dialysate (e) circulated through the dialysis membrane module (100) as the second unit were changed as listed in Table 2.

Comparative Example 1

Operation was carried out in the same manner as Example 1, except that the dialysis membrane module (100) was not used.

When the volume reduction factor reached 2.6-fold at 4 hours after the start of operation, the operation was halted because cloudiness was confirmed in the raw material liquid.

The clouded raw material liquid was filtered to remove the precipitated solid, and the glutathione disulfide concentration in the filtrate was analyzed to calculate the valuable substance yield. The valuable substance yield in Comparative Example 1 was 59.9%.

A small amount of the raw material liquid was extracted every hour after the start of operation, monitoring the acetonitrile concentration by gas chromatography, whereby it was found that the acetonitrile concentration was continuously increasing, rising from 50 wt % as the initial concentration up to 61 wt % at the point where operation was halted.

Comparative Example 2

Operation was carried out in the same manner as Example 1, except that the forward osmosis membrane module (500) was not used. When operation was carried out while monitoring the weight of the raw material liquid in the raw material liquid tank (200), no weight reduction in the raw material liquid was found even at 1 hour after the start of operation. It was therefore judged that volume reduction had not taken place in this Comparative Example, and operation was halted.

Comparative Example 3

Operation was carried out in the same manner as Example 1, except that a membrane module for membrane distillation 1 was used as the second unit instead of a dialysis membrane module (100), and membrane distillation treatment was carried out while circulating cooling water at 10° C., instead of dialysis treatment. Outward visible changes suggesting wetting of the membranes of the membrane module for membrane distillation were observed 4 hours after the start of operation, and therefore operation was halted. The glutathione disulfide concentration in the raw material liquid (a) was analyzed by ICP-MS, calculating the yield at the point where operation was halted. The glutathione disulfide yield was 45%.

Comparative Example 4

Operation was carried out in the same manner as Example 9, except that the dialysis membrane module (100) was not used.

The results for Examples 1 to 9 and Comparative Examples 1 to 4 are shown in Table 2.

TABLE 2

| | | First unit | | | Second unit | | |
|---|---|---|---|---|---|---|---|
| | System for reducing raw material liquid volume | Treatment method | Unit type | Draw solution | Treatment method | Unit type | Dialysate |
| Example 1 | System for reducing raw material liquid volume (2) | Forward osmosis | Forward osmosis membrane module 1 | 50 wt % aqueous isopropanol | Dialysis | Dialysis membrane module 1 | Water |
| Example 2 | System for reducing raw material liquid volume (2) | Forward osmosis | Forward osmosis membrane module 1 | 50 wt % aqueous isopropanol | Dialysis | Dialysis membrane module 1 | Water |
| Example 3 | System for reducing raw material liquid volume (2) | Forward osmosis | Forward osmosis membrane module 1 | 50 wt % aqueous isopropanol | Dialysis | Dialysis membrane module 1 | Water |
| Example 4 | System for reducing raw material liquid volume (2) | Forward osmosis | Forward osmosis membrane module 1 | 50 wt % aqueous isopropanol | Dialysis | Dialysis membrane module 1 | 5 wt % aqueous acetonitrile |

TABLE 2-continued

| | | | | | | | |
|---|---|---|---|---|---|---|---|
| Example 5 | System for reducing volume of raw material liquid (2) | Forward osmosis | Forward osmosis membrane module 1 | 50 wt % aqueous isopropanol | Dialysis | Dialysis membrane module 1 | 0.5 wt % aqueous sodium chloride |
| Example 6 | System for reducing raw material liquid volume (2) | Forward osmosis | Forward osmosis membrane module 1 | 50 wt % aqueous isopropanol | Dialysis | Dialysis membrane module 1 | Water |
| Example 7 | System for reducing raw material liquid volume (2) | Forward osmosis | Forward osmosis membrane module 1 | 50 wt % aqueous isopropanol | Dialysis | Dialysis membrane module 2 | Water |
| Example 8 | System for reducing raw material liquid volume (3) | Nano-filtration | Nanofiltration membrane module 1 | — | Dialysis | Dialysis membrane module 1 | Water |
| Example 9 | System for reducing raw material liquid volume (1) | Evaporation | Distillation unit 1 | — | Dialysis | Dialysis membrane module 1 | 90 wt % aqueous methanol |
| Comp. Example 1 | System for reducing raw material liquid volume (2) | Forward osmosis | Forward osmosis membrane module 1 | 50 wt % aqueous isopropanol | — | — | — |
| Comp. Example 2 | System for reducing raw material liquid volume (2) | — | — | — | Dialysis | Dialysis membrane module 1 | Water |
| Comp. Example 3 | System for reducing raw material liquid volume (2) | Forward osmosis | Forward osmosis membrane module 1 | 50 wt % aqueous isopropanol | Membrane distillation | Membrane module for membrane distillation 1 | — |
| Comp. Example 4 | System for reducing raw material liquid volume (1) | Evaporation | Distillation unit 1 | — | — | — | — |

| | Raw material liquid composition | | | | Results | |
|---|---|---|---|---|---|---|
| | Valuable substance | First solvent | Second solvent | Accessory component | Volume reduction factor (times) | Yield (%) |
| Example 1 | Glutathione disulfide, 0.2 wt % | Water | Acetonitrile 50 wt % | Acetic acid, 0.6 wt % | 13 | 99< |
| Example 2 | Glutathione disulfide, 0.2 wt % | Water | Acetonitrile 50 wt % | — | 13 | 99< |
| Example 3 | Glutathione disulfide, 0.2 wt % | Water | — | Acetic acid, 0.6 wt % | 13 | 99< |
| Example 4 | Glutathione disulfide, 0.2 wt % | Water | Acetonitrile 50 wt % | — | 13 | 99< |
| Example 5 | Glutathione disulfide, 0.2 wt % | Water | | Sodium chloride (3.5 wt %) | 13 | 99< |
| Example 6 | Glutathione disulfide, 0.2 wt % | Water | | Sodium chloride (3.5 wt %) | 13 | 99< |
| Example 7 | Glutathione disulfide, 0.2 wt % | Water | Acetonitrile 50 wt % | Acetic acid, 0.6 wt % | 13 | 99< |
| Example 8 | Glutathione disulfide, 0.2 wt % | Water | Acetonitrile 50 wt % | Acetic acid, 0.6 wt % | 10 | 96 |
| Example 9 | Penta-O-acetyl-β-D-glucopyranose, 2 wt % | MeOH | 10 wt % water | — | 3 | 99< |
| Comp. Example 1 | Glutathione disulfide, 0.2 wt % | Water | Acetonitrile 50 wt % | Acetic acid, 0.6 wt % | 2.6 | 59.9 |
| Comp. Example 2 | Glutathione disulfide, 0.2 wt % | Water | Acetonitrile 50 wt % | Acetic acid, 0.6 wt % | — | — |
| Comp. Example 3 | Glutathione disulfide, 0.2 wt % | Water | Acetonitrile 50 wt % | Acetic acid, 0.6 wt % | 13 | 45.0 |
| Comp. Example 4 | Penta-O-acetyl-β-D-glucopyranose, 2 wt % | MeOH | 10 wt % water | — | 3 | 51 |

As understood by the results for Comparative Examples 1 and 4, when carrying out the first treatment alone, the raw material liquid was reduced in volume but with precipitation in the raw material liquid as volume reduction proceeded, resulting in a low yield of the valuable substance. Formation of precipitates in the raw material liquid was attributed to precipitation of the valuable substance occurring due to increasing concentration of the valuable substance as volume reduction progressed, while the concentration of the solvent composition or accessory component could not be adjusted to a range allowing the valuable substance to stably exist.

The results for Comparative Example 2 also demonstrated that volume reduction of the raw material liquid cannot be achieved by the second treatment alone.

Based on the results for Comparative Example 3, volume reduction of the raw material liquid was achieved when the second treatment was carried out by membrane distillation, but the valuable substance yield in the raw material liquid was limited to a low value.

In contrast, the method of the invention, which combines volume reduction by the first treatment and dialysis as the second treatment, was confirmed to result in a high degree of volume reduction without producing precipitates in the raw material liquid. This suggests that the volume reduction of a raw material liquid by the method of the invention is possible while keeping the solvent composition and accessory component concentration in the raw material liquid to within the desired ranges.

It was thus confirmed that the method of the invention can reduce volume to a high degree, with a high yield of valuable substances.

REFERENCE SIGNS LIST

1, 2, 3, 4 System for reducing volume of raw material liquid
100 Dialysis membrane module
110 Housing
111 Dialysate inlet
112 Dialysate outlet
120 Dialysis membrane
121 Substrate layer
122 Active layer
130, 530 Adhesive resin
200 Raw material liquid tank
300 Dialysate tank
400 Trap
500 Forward osmosis membrane module
510 Housing
511 Draw solution inlet
512 Draw solution outlet
520 Forward osmosis membrane
521 Substrate layer
522 Active layer
600 Draw solution tank
700 Nanofiltration membrane module
800 Permeate tank
900 Evaporation unit
a Raw material liquid
b First solvent
c Volume reduced raw material liquid
d Draw solution
e Dialysate
f Component concentration-adjusted raw material liquid
g Second solvent or accessory component
BL Blower
HM Hydrometer
LG Level gauge
P Pump
V Valve

The invention claimed is:

1. A method for reducing the volume of a raw material liquid in which a raw material liquid including at least a valuable substance and a first solvent is reduced in volume, wherein the raw material liquid:

further includes an accessory component in addition to the valuable substance and first solvent, or includes a mixed solvent formed by mixing the first solvent and a second solvent to form the mixed solvent, and the method for reducing the volume of a raw material liquid is a method combining:

a first treatment in which the first solvent is removed from the raw material liquid, and a second treatment in which the concentration of the second solvent or the accessory component in the raw material liquid is adjusted by dialysis using a dialysis membrane.

2. The method for reducing the volume of a raw material liquid according to claim 1, wherein the dialysis membrane used in the second treatment is a molecular sieve membrane.

3. The method for reducing the volume of a raw material liquid according to claim 2, wherein the first treatment is volume reduction treatment using a membrane, by a reverse osmosis method, nanofiltration method or forward osmosis method.

4. The method for reducing the volume of a raw material liquid according to claim 2, wherein the first treatment is a forward osmosis method.

5. The method for reducing the volume of a raw material liquid according to claim 3, wherein:

the permeability of the molecular sieve membrane used in the second treatment for the second solvent or the accessory component is greater than the permeability of the membrane used in the first treatment for the second solvent or the accessory component.

6. The method for reducing the volume of a raw material liquid according to claim 1, which includes carrying out the second treatment after having carried out the first treatment.

7. The method for reducing the volume of a raw material liquid according to claim 1, which includes carrying out the first treatment after having carried out the second treatment.

8. The method for reducing the volume of a raw material liquid according to claim 1, which includes carrying out the first treatment and the second treatment in parallel and mixing the raw material liquid after each treatment.

9. The method for reducing the volume of a raw material liquid according to claim 6, wherein the raw material liquid is subjected to the first treatment and the second treatment in a cyclical manner.

10. The method for reducing the volume of a raw material liquid according to claim 9, wherein the concentration of at least one of the components in the raw material liquid subjected to cyclical volume reduction is measured and the obtained measured value is used for deciding change in execution, halting or the operating conditions of either or both of the first treatment and second treatment.

11. The method for reducing the volume of a raw material liquid according to claim 10, wherein the concentration measurement is carried out using the measurement results for one or more selected from the group consisting of specific gravity measurement, pH measurement, conductivity measurement, liquid level measurement, optical rotation measurement, refractive index measurement, near-infrared spectroscopic analysis and weight measurement of the raw material liquid subjected to cyclical volume reduction.

12. The method for reducing the volume of a raw material liquid according to claim 1, wherein the valuable substance is a pharmaceutical raw material.

13. The method for reducing the volume of a raw material liquid according to claim 1, wherein the number-average molecular weight of the valuable substance is 100 to 50,000.

14. The method for reducing the volume of a raw material liquid according to claim 1, wherein the valuable substance is one or more selected from the group consisting of amino acids, peptides, proteins, sugars, vaccines, nucleic acids, antibiotics, antibody-drug conjugates (ADC) and vitamins.

15. The method for reducing the volume of a raw material liquid according to claim 1, wherein:

the second solvent is one or more selected from among water, acetonitrile, methanol, ethanol and isopropanol, and the accessory component is one or more selected from the group consisting of organic acids, polymers (excluding the valuable substance) and buffer salts.

16. The method for reducing the volume of a raw material liquid according to claim 1, wherein the temperature of the raw material liquid is adjusted to within the range of 1° C. or higher and 50° C. or lower.

17. The method for reducing the volume of a raw material liquid according to claim 3, wherein one or more selected from among methanol, ethanol, isopropanol and t-butanol is used as the solute in the draw solution for the forward osmosis method.

18. The method for reducing the volume of a raw material liquid according to claim 4, wherein:

the permeability of the molecular sieve membrane used in the second treatment for the second solvent or the accessory component is greater than the permeability of the membrane used in the first treatment for the second solvent or the accessory component.

19. The method for reducing the volume of a raw material liquid according to claim 7, wherein the raw material liquid is subjected to the first treatment and the second treatment in a cyclical manner.

20. The method for reducing the volume of a raw material liquid according to claim 8, wherein the raw material liquid is subjected to the first treatment and the second treatment in a cyclical manner.

* * * * *